United States Patent [19]
Hayashi et al.

[11] Patent Number: 5,587,232
[45] Date of Patent: Dec. 24, 1996

[54] NON-MAGNETIC PARTICLES FOR NON-MAGNETIC UNDERCOATING LAYER OF MAGNETIC RECORDING MEDIUM, NON-MAGNETIC UNDERCOATING LAYER CONTAINING THE SAME, AND MAGNETIC RECORDING MEDIUM HAVING THE UNDERCOATING LAYER

[75] Inventors: Kazuyuki Hayashi; Keisuke Iwasaki; Yasuyuki Tanaka; Minoru Ohsugi; Toshiharu Harada; Masaru Isoai; Kazushi Takama, all of Hiroshima, Japan

[73] Assignee: Toda Kogyo Corporation, Japan

[21] Appl. No.: 101,063

[22] Filed: Aug. 4, 1993

[30] Foreign Application Priority Data

Aug. 7, 1992 [JP] Japan ..................... 4-232959

[51] Int. Cl.⁶ ................ G11B 5/66; B32B 5/16
[52] U.S. Cl. .......... 428/323; 428/328; 428/329; 428/331; 428/694 B; 428/694 BS; 428/694 BN; 428/900; 428/336
[58] Field of Search .................. 428/323, 329, 428/328, 331, 336, 900, 694 B, 694 BS, 694 BN

[56] References Cited

U.S. PATENT DOCUMENTS

| | | | |
|---|---|---|---|
| 4,076,890 | 2/1978 | Yamada | 428/337 |
| 4,789,581 | 12/1988 | Nakamura | 428/328 |
| 4,863,793 | 9/1989 | Ogawa et al. | 428/323 |
| 5,035,948 | 7/1991 | Saito | 428/328 |
| 5,089,317 | 2/1992 | Noguchi | 428/212 |
| 5,219,652 | 6/1993 | Shimasoho | 428/323 |

FOREIGN PATENT DOCUMENTS

| | | |
|---|---|---|
| 62-295217 | 12/1987 | Japan . |
| 63-187418 | 8/1988 | Japan . |
| 4-167225 | 6/1992 | Japan . |
| 4-325915 | 11/1992 | Japan . |

*Primary Examiner*—Leszek Kiliman
*Attorney, Agent, or Firm*—Nixon & Vanderhye

[57] ABSTRACT

Disclosed herein are non-magnetic particles for a non-magnetic undercoat layer of a magnetic recording medium, comprising acicular or spindle-shaped $\alpha$-$Fe_2O_3$ particles coated with at least one selected from the group consisting of an Al compound, a silane coupling agent, a titanate coupling agent, an aluminate coupling agent and a zirconate coupling agent; a non-magnetic undercoating layer containing such non-magnetic particles; and magnetic recording medium having such an undercoating layer.

14 Claims, No Drawings

NON-MAGNETIC PARTICLES FOR NON-MAGNETIC UNDERCOATING LAYER OF MAGNETIC RECORDING MEDIUM, NON-MAGNETIC UNDERCOATING LAYER CONTAINING THE SAME, AND MAGNETIC RECORDING MEDIUM HAVING THE UNDERCOATING LAYER

BACKGROUND OF THE INVENTION

The present invention relates to non-magnetic particles for a non-magnetic undercoating layer of a magnetic recording medium, a non-magnetic undercoating layer containing such non-magnetic particles, and a magnetic recording medium having such an undercoating layer.

With a development of miniaturized and lightweight video or audio magnetic recording and reproducing apparatuses for long-time recording, magnetic recording media such as a magnetic tape and magnetic disk have been strongly required to have a higher performance, namely, a higher recording density and to reduce the noise level.

Especially, video tapes are required to have a higher picture quality, and the frequencies of carrier signals recorded in recent video tapes are higher than those recorded in conventional video tapes. In other words, the signals in the shortwave region have come to be used, and as a result, the magnetization thickness (magnetization depth) from the surface of a magnetic tape has come to be remarkably small (shallow).

With respect to signals having a short wavelength, efforts have also been made to improve the high output characteristics, especially, the S/N ratio, as described in the following literature. For example, *Development of magnetic Materials and Technique for High Dispersion of magnetic Powder*, published by Kabushiki Kaisha Sogo Gijutsu Center (1982) described on page 74, " . . . in the recording and reproducing characteristics, technical problems in designing a magnetic coating layer so as to produce a high recording density by achieving various requirements in electromagnetic conversion property such as a reduction in the noise level, improvement of the S/N ratio, the sensitivity and the frequency characteristics, and a reduction in the output fluctuation, are (1) to improve the uniform dispersibility of magnetic particles and the magnetic orientation, (2) to increase the packing ratio of magnetic particles in a coating film and (3) to provide a coating film with an excellent surface smoothness and a uniform thickness . . . ", and on page 312, " . . . the conditions for high-density recording in a coating-type tape are that the noise level is low with respect to signals having a short wavelength and that the high output characteristics are maintained. To satisfy these conditions, it is necessary that the tape has large coercive force (Hc) and residual magnetization (Br), . . . and the coating film has a smaller thickness . . . ".

Development of a thinner film for a magnetic recording layer has caused some problems.

Firstly, it is necessary to make a magnetic recording layer smooth and to remove the non-uniformity of thickness thereof. As well known, in order to obtain a smooth magnetic recording layer having a uniform thickness, the surface of the base film must also be smooth. This fact is described on pages 180 and 181 of *Material for Synthetic Technology-Causes of Abrasion of Magnetic Tape and Head Running System and Measures for Solving the Problem* (hereinunder referred to as "*Materials for Synthetic Technology)*" (1987), published by the publishing department of Technology Information Center, " . . . the surface roughness of a hardened magnetic layer depends on the surface roughness of the base film (back surface roughness) so largely as to be approximately proportional, . . . since the magnetic layer is formed on the surface of the base film, the more smooth the surface of the base film is, the more uniform and larger head output is obtained and the more the S/N ratio is improved".

Secondly, a problem in the strength of a base film has been caused with a tendency of the reduction in the thickness of a base film in response to the demand for a thinner magnetic layer. This fact is described, for example, on page 77 of the above-described *Development of Magnetic Materials and Technique for High Dispersion of Magnetic Powder*, " . . . Higher recording density is a large problem assigned to the present magnetic tape. This is important in order to shorten the length of the tape so as to miniaturize a cassette and to enable long-time recording. For this purpose, it is necessary to reduce the thickness of a base film . . . . With the tendency of reduction in the film thickness, the stiffness of the tape also reduces to such an extent as to make smooth travelling in a recorder difficult. Therefore, improvement of the stiffness of a video tape both in the longitudinal direction and in the transverse direction is now strongly demanded . . . "

Thirdly, there is a problem of too large a light transmittance caused by ultra-fine magnetic particles and a thin magnetic recording layer. Travel of a magnetic recording medium such as a magnetic tape, especially, a video tape is stopped when the video deck detects a portion of the magnetic recording medium at which the light transmittance is large. If the light transmittance of the whole part of a magnetic recording layer is made large by the production of a thinner magnetic recording medium or the ultra-fine magnetic particles dispersed in the magnetic coating layer, it is difficult to detect the portion having a large light transmittance by a video deck. As a measure for reducing the light transmittance of the magnetic coating layer, carbon black or the like is added to the magnetic recording layer. It is, therefore, essential to add carbon black or the like to a magnetic coating layer in the present video tapes.

However, addition of non-magnetic particles such as carbon black not only impairs the enhancement of the recording density but also reduces the magnetization thickness from the surface of the magnetic tape. It is, therefore, unfavorable to add non-magnetic particles to a magnetic coating layer.

To solve this problem, a magnetic recording medium having a base film composed of a non-magnetic substrate and an undercoating layer containing non-magnetic particles has been proposed.

For example, Japanese Patent Application Laid-Open (KOKAI) No. 63-187418 (1988) proposes a magnetic recording medium comprising a non-magnetic substrate, at least one undercoating layer obtained by dispersing non-magnetic particles in a binder, and a magnetic coating layer obtained by dispersing ferromagnetic particles in a binder, wherein the ferromagnetic particles are ferromagnetic iron oxide particles, ferromagnetic cobalt-modified iron oxide particles or ferromagnetic alloy particles, the average major axis diameter of the ferromagnetic particles measured through a transmission electron microscope is less than 0.30 µm and the crystalline size thereof by X-ray diffraction is less than 300 Å.

According to the specification thereof, the non-magnetic particles used for the undercoating layer are carbon black, graphite, titanium oxide, barium sulfate, ZnS, $MgCO_3$, ZnO, CaO, γ-iron oxide, tungsten disulfite, molybdenum disulfite, boron nitride, MgO, $SnO_2$, $SiO_2$, $Cr_2O_3$, a-$Al_2O_3$, SiC, cerium oxide, corundum, synthetic diamond, α-iron oxide, garnet, quartzite, silicon nitride, silicon carbide, molybdenum carbide, boron carbide, tungsten carbide, titanium carbide, tripoli, diatomaceous, dolomite or the like. Among these, inorganic particles such as carbon black, $CaCO_3$, titanium oxide, barium sulfate, α-$Al_2O_3$, α-iron oxide, γ-iron oxide and polymer particles such as polyethylene particles are preferable. The particle diameter of such non-magnetic particles is 1 to 1000 mμ in the case of granular particles, and 100 mμ to 5μ in major axis diameter and 1 to 1000 mμ in minor axis diameter in the case of acicular particles.

However, as a result of examination of the above-described non-magnetic particles by the present inventors, it has been found that the surface smoothness and the strength are unsatisfactory not only when granular non-magnetic particles are used but also when acicular non-magnetic particles are used.

Japanese Patent Application Laid-Open (KOKAI) No. 4-167225 (1992) proposes a magnetic recording medium produced by forming a magnetic coating layer on the surface of a non-magnetic substrate through an undercoating layer which contains acicular particles having an aspect ratio of more than 3.0 in a resin binder hardened when irradiated with an electromagnetic wave such as radioactive rays and ultraviolet rays.

However, in the case of using acicular α-FeOOH particles, which are described as the acicular particles in examples thereof, since much crystal water is contained in the surfaces of acicular α-FeOOH particles, the conformity of the particles with a binder resin and a solvent is so poor that the desired dispersibility is not obtained.

Japanese Patent Application Laid-Open (KOKAI) No. 4-325915 (1992) proposes a magnetic recording medium produced by coating on a non-magnetic substrate with an undercoating layer at least containing non-magnetic particles and a binder, and coating on the undercoating layer in the moistened state with an upper magnetic coating layer containing ferromagnetic particles and a binder, wherein an aspect ratio of the non-magnetic particles is not less than 2.5, the thickness of the upper magnetic coating layer in the dried state is not more than 1 μm and the average particle diameter of the ferromagnetic particles having the major axis diameter is not more than 0.3 μm.

As examples of preferred acicular non-magnetic particles are exemplified non-magnetic metals such as Cu, Cr, Ag, Al, Ti and W and the oxides thereof such as $Al_2O_3$ (α,γ), $Cr_2O_3$, α-ferrite, goethite, $SiO_2$ (including glass), $ZrO_2$, $CeO_2$ and $TiO_2$ (rutile, anatase), and as examples of scaly non-magnetic particles, graphite, mica, boron nitride, etc. are exemplified.

Even when acicular non-magnetic particles such as α-ferrite which are described in Japanese Patent Application Laid-Open (KOKAI) No. 4-325915 (1992) are used, it is difficult to obtain the desired dispersibility, so that the surface smoothness and the strength of such a magnetic medium having a non-magnetic undercoat layer are insufficient.

Use of coated α-$Fe_2O_3$ is proposed in Japanese Patent Application Laid-Open (KOKAI) No. 62-295217 (1987). It discloses a magnetic recording medium comprising a substrate and a magnetic coating layer containing magnetic particles and a binder, wherein the magnetic coating layer contains α-$Fe_2O_3$ particles which are coated with a compound containing at least one selected from the group consisting of Si, Cr and Al.

Use of coated α-$Fe_2O_3$, however, not only impairs the improvement of the recording density in the same way as addition of non-magnetic carbon black, but also impairs the reduction in the thickness of the film. As described above, the magnetization thickness from the surface of the magnetic tape is reduced and the reduction in the thickness of the film is insufficient.

In addition, in Japanese Patent Application Laid-Open (KOKAI) No. 62-295217 (1987), there is no description of the formation of a non-magnetic undercoating layer on the non-magnetic substrate. Also, there is no description which motivates the addition of non-magnetic particles composed of α-$Fe_2O_3$ particles which are coated with a compound containing at least one selected from the group consisting of Si, Cr and Al to a non-magnetic undercoating layer. In other words, there is no description which motivates a combination of Japanese Patent Application Laid-Open (KOKAI) Nos. 63-187418 (1988), 4-167225 (1992) and 4-325915 (1992). That is, Japanese Patent Application Laid-Open (KOKAI) No. 62-295217 (1987) describes the addition of coated α-$Fe_2O_3$ particles to a magnetic coating layer only in order to provide the magnetic coating layer with an excellent wear resistance and an appropriate magnetic head-abrasive property.

Accordingly, non-magnetic particles which impart to an undercoating layer excellent properties such as an excellent surface smoothness and a high strength, a non-magnetic undercoating layer having an excellent surface smoothness and a high strength so as to provide such a magnetic recording medium and a magnetic recording medium having a small light transmittance, an excellent surface smoothness and a uniform thickness are now strongly demanded.

As a result of studies undertaken by the present inventors so as to achieve such demands, it has been found that by making non-magnetic particles obtained by coating acicular or spindle-shaped α-$Fe_2O_3$ particles with at least one selected from the group consisting of an Al compound, a silane coupling agent, a titanate coupling agent, a aluminate coupling agent and a zirconate coupling agent, contain in a non-magnetic undercoating layer for a magnetic recording medium, it is possible to produce a magnetic recording medium which has a base film having a strength high enough as a base film for a magnetic recording medium and an excellent surface smoothness, and which has a small light transmittance, a high smoothness and a uniform thickness. On the basis of this finding, the present invention has been achieved.

SUMMARY OF THE INVENTION

It is an object of the present invention to provide non-magnetic particles which impart to a non-magnetic undercoating layer for a magnetic recording medium an excellent surface smoothness and a high strength.

It is another object of the present invention to provide a magnetic recording medium having a small light transmittance, an excellent smoothness and a uniform thickness.

In a first aspect of the present invention, there are provided non-magnetic particles for a non-magnetic undercoating layer of a magnetic recording medium, comprising acicular or spindle-shaped α-$Fe_2O_3$ particles coated with at least one selected from the group consisting of an Al compound, a silane coupling agent, a titanate coupling agent, an aluminate coupling agent and a zirconate coupling agent.

In a second aspect of the present invention, there is provided a non-magnetic undercoating layer for a magnetic recording medium, which is formed on a non-magnetic substrate, comprising non-magnetic particles composed of acicular or spindle-shaped $\alpha\text{-Fe}_2\text{O}_3$ particles coated with at least one selected from the group consisting of an Al compound, a silane coupling agent, a titanate coupling agent, an aluminate coupling agent and a zirconate coupling agent; and a binder resin.

In a third aspect of the present invention, there is provided a magnetic recording medium comprising a base film composed of a non-magnetic substrate, and an undercoating layer formed on the non-magnetic substrate and containing non-magnetic particles which are composed of acicular or spindle-shaped $\alpha\text{-Fe}_2\text{O}_3$ particles coated with at least one selected from the group consisting of an Al compound, a silane coupling agent, a titanate coupling agent, an aluminate coupling agent and a zirconate coupling agent, and a binder resin; and a magnetic coating layer containing magnetic particles and a binder resin.

DETAILED DESCRIPTION OF THE INVENTION

The precursor particles for the acicular or spindle-shaped $\alpha\text{-Fe}_2\text{O}_3$ particles used in the present invention are acicular or spindle-shaped goethite particles generally produced by (1) a process of acicular goethite particles by oxidizing a suspension containing colloidal ferrous hydroxide particles and having a pH of not less than 11 which is obtained by adding not less than an equivalent of an alkali hydroxide solution to an aqueous ferrous salt solution, by passing an oxygen-containing gas thereinto at a temperature of not higher than 80° C.; (2) a process of producing spindle-shaped goethite particles by oxidizing a suspension containing $\text{FeCO}_3$ which is obtained by reacting an aqueous ferrous salt solution with an aqueous alkali carbonate solution, by passing an oxygen-containing gas thereinto; (3) a process of producing acicular goethite particles by oxidizing a ferrous salt solution containing colloidal ferrous hydroxide or a precipitate containing iron, obtained by adding less than an equivalent of an alkali hydroxide solution or an alkali carbonate solution to an aqueous ferrous salt solution, by passing an oxygen-containing gas thereinto to produce acicular goethite seed particles; adding not less than an equivalent of an alkali hydroxide solution to the aqueous ferrous salt solution containing the acicular goethite seed particles, and growing the acicular goethite seed particles by passing an oxygen-containing gas into the aqueous ferrous salt solution; and (4) a process of producing acicular or spindle-shaped goethite particles by oxidizing a ferrous salt solution containing colloidal ferrous hydroxide or a precipitate containing iron, obtained by adding less than an equivalent of an alkali hydroxide solution or an alkali carbonate solution to an aqueous ferrous salt solution, by passing an oxygen-containing gas thereinto to produce acicular goethite seed particles, and growing the acicular goethite seed particles in an acidic or neutral region. The thus obtained precursor particles are heated and dehydrated and if necessary, then heat-treated, thereby obtaining the acicular or spindle-shaped $\alpha\text{-Fe}_2\text{O}_3$ particles according to the present invention. Also, the acicular or spindle-shaped $\alpha\text{-Fe}_2\text{O}_3$ particles of the present invention are directly produced by oxidizing a solution containing $\text{FeCO}_3$ passing an oxygen-containing gas (refer to Japanese Patent Application Laid-Open (KOKAI) Nos. 61-14138 (1986), 61-14138 (1981), 62-128927 (1982) and 62-128930 (1982)

Elements other than Fe such as Ni, Zn, P and Si which are generally added in order to enhance properties of the particles may be added during the reaction for producing the goethite particles.

By dehydrating the acicular or spindle-shaped goethite particles as the precursor particles at a temperature of 200° to 500° C. and heat-treating (annealing) the dehydrated particles, if necessary, at a temperature of 350° to 800° C., acicular or spindle-shaped $\alpha\text{-Fe}_2\text{O}_3$ particles are obtained.

There is no problem even if there is a sintering preventive such as P, Si, B, Zr and Sb on the surface of the acicular or spindle-shaped goethite particles.

By heat-treating (annealing) the acicular or spindle-shaped $\alpha\text{-Fe}_2\text{O}_3$ particles at a temperature of 350° to 800° C., due to the heat-melting the surfaces of the particles, the pores in the surfaces of the dehydrated acicular or spindle-shaped $\alpha\text{-Fe}_2\text{O}_3$ particles are filled in, and a smooth surface is obtained.

The coated acicular or spindle-shaped $\alpha\text{-Fe}_2\text{O}_3$ particles in the present invention are obtained by dispersing the acicular or spindle-shaped $\alpha\text{-Fe}_2\text{O}_3$ particles obtained by the above-mentioned process in a solution containing an Al compound to form a suspension, or by dispersing the acicular or spindle-shaped $\alpha\text{-Fe}_2\text{O}_3$ particles in an aqueous solution to form a suspension and adding an Al compound to the suspension, while adjusting the pH so as to coat the surfaces of the particles with the Al compound, filtering, washing with water, drying, pulverizing, and further, if necessary, deaerating and consolidating, thereby obtaining the coated particles.

As the Al compound in the present invention, aluminum salts such as aluminum acetate, aluminum sulfate, aluminum chloride and aluminum nitrate and alkali aluminates such as soda aluminate are usable.

Also, the dehydrated (and annealed) acicular or spindle-shaped $\alpha\text{-Fe}_2\text{O}_3$ particles are coated with at least one coupling agent selected from the group consisting of a silane coupling agent, a titanate coupling agent, an aluminate coupling agent and a zirconate coupling agent. As a method of coating the acicular or spindle-shaped $\alpha\text{-Fe}_2\text{O}_3$ particles with a coupling agent, there are (i) a dry process of adding a coupling agent as it is to the acicular or spindle-shaped $\alpha\text{-Fe}_2\text{O}_3$ particles, and co-mixing the resultant mixture by a mixer which enables the whole amount of added coupling agent to be adsorbed on the surfaces of the particles, and (ii) a wet process such as a process of adding the acicular or spindle-shaped $\alpha\text{-Fe}_2\text{O}_3$ particles and a coupling agent to a solution composed of water as a liquid dispersion medium, stirring the resultant mixture, adjusting the pH by adding an aqueous acid or alkali solution thereto and drying the mixture, and a process of adding the acicular or spindle-shaped $\alpha\text{-Fe}_2\text{O}_3$ particles and a coupling agent to a solution composed of an organic solvent as a liquid dispersion medium, stirring the resultant mixture and drying the mixture.

As the mixer used in the present invention, Henschel mixer, ball mill, atomizer colloid mill, edge runner, Simpson mix muller, multimuller, Stotz mill, back flow mixer, Irich mill, wet pan mill, melanger, whirl mill and quick mill are usable.

The concentration of the acicular or spindle-shaped $\alpha\text{-Fe}_2\text{O}_3$ particles dispersed in the liquid dispersion medium is 5 to 20 wt %. If the concentration exceeds 20 wt %, the viscosity of the suspension is too high for sufficient mixing and uniform surface treatment. On the other hand, if the concentration is less than 5 wt %, the amount of medium filtered is too large for industrial advantage.

In the case of using water as the liquid dispersion medium and a water-soluble titatnate coupling agent as the coupling agent, after the coupling agent is added in the form of an aqueous solution and the resultant dispersion is stirred, the pH thereof is adjusted to the range of 6.0 to 8.0 by adding an aqueous acid or alkali solution.

As the water-soluble titanate coupling agent, triethanol amine titanate chelate, lactic acid titanate chelate, and isopropyltri(N-aminoethyl.aminoethyl) titanate are usable.

As the aqueous solutions used for adjusting the pH, in case of an alkali region, aqueous acid solutions such as acetic acid, hydrochloric acid and sulfuric acid may be exemplified, and in case of an acidic region, aqueous alkali solutions such as $NH_4OH$, NaOH, KOH and $Na_2CO_3$ may be exemplified.

Aqueous acetic acid solution and aqueous $NH_4OH$ solution are preferable, because the pH adjuster does not remain on the surfaces of the particles after drying.

If the pH is less than 6.0, an acid radical sometimes unfavorably remains on the surface of the particles. If the pH exceeds 8.0, there is a fear of a titanate coupling agent being decomposed.

In the present invention, when an organic solvent is used as the liquid dispersion medium and at least one coupling agent selected from the group consisting of a silane coupling agent, a titanate coupling agent, an aluminate coupling agent and a zirconate coupling agent which are soluble to the organic solvent, is used, the adjustment of the pH is not necessary.

As examples of the silane coupling agent, the titanate coupling agent, the aluminate coupling agent and the zirconate coupling agent used when an organic solvent is used as the liquid dispersion medium, the following known coupling agents may be cited.

As the silane coupling agents, vinyltriethoxysilane, vinyltrimethoxysilane, vinyltrichlorosilane, vinyltris(β-methoxyethoxy)silane, γ-(methacryloxypropyl)trimethoxysilane, γ-aminopropyltrimethoxysilane, N-β-(aminoethyl)γ-aminopropyltrimethoxysilane, β-(3,4epoxycyclohexyl)ethyl trimethoxysilane, γ-glycidoxypropyltrimethoxysilane and γ-mercaptopropyltrimethoxysilane may be exemplified.

As the titanate coupling agents, isopropyltristearoyl titanate, isopropyltris (dioctylpyrophosphate) titanate, isopropyltri (N-aminoethyl.aminoethyl)titanate, tetraoctylbis (ditridecyl phosphate) titanate, tetra (2-2-diallyloxymethyl-1-butyl)bis(ditridecyl)phosphate titanate, bis(dioctylpyrophosphate) oxyacetate titanate and bis(dioctylpyrophosphate) ethylenetitanate may be exemplified.

As the aluminate coupling agents, acetoalkoxyaluminum diisopropylate, aluminum diisopropoxymonoethyl acetoacetate, aluminumtrisethyl acetoacetate and aluminumtrisacetyl acetonate may be exemplified.

As the zirconate coupling agents, zirconiumtetrakis acetylacetonate, zirconiumdibuthoxybis acetylacetonate, zirconiumtetrakisethyl acetoacetate, zirconiumtributhoxymonoethyl acetoacetate and zirconiumtributhoxy acetoacetonate may be exemplified.

As the organic solvent, all organic solvents which can solve the coupling agent are usable. For example, alcohols such as methanol, ethanol and propanol, ketones such as methylethyl ketone, methylisobutyl ketone and cyclohexanone, aromatic hydrocarbons such as toluene, xylene and benzene, and esters such as methyl acetate, ether acetate, propyl acetate and butyl acetate are usable.

When two or more coupling agents are used for coating the particles, the order of addition is not restricted. They may also be added simultaneously.

The amount of Al compound added is 0.01 to 50.00 parts by weight, preferably 0.05 to 20.0 parts by weight, more preferably 0.1 to 10 parts by weight based on 100 parts by weight of acicular or spindle-shaped $\alpha$-$Fe_2O_3$ particles. If the amount is less than 0.01 part by weight, the dispersion thereof in the binder resin is insufficient, while the amount exceeding 50.00 parts by weight is unfavorable, because Al compounds floating outside the surfaces of the particles interact.

In the present invention, it is preferable to coat the acicular or spindle-shaped $\alpha$-$Fe_2O_3$ particles with an aluminum compound, because when the coated acicular or spindle-shaped $\alpha$-$Fe_2O_3$ particles are dispersed in the binder resin for forming an undercoating layer, the conformity of the acicular or spindle-shaped $\alpha$-$Fe_2O_3$ particles with the binder resin is good and the desired dispersibility is easy to obtain.

The amount of coupling agent added is 0.01 to 50 parts by weight, preferably 0.01 to 20 parts by weight, more preferably 0.05 to 10 parts by weight based on 100 parts by weight of acicular or spindle-shaped $\alpha$-$Fe_2O_3$ particles. If the amount is less than 0.01 part by weight, the advantages aimed at in the present invention are not obtained. Even if the amount exceeds 50 wt %, the advantages aimed at in the present invention are obtained, but since the amount of coupling agent treated is more than the amount corresponding to the adsorption by a monolayer, the advantage aimed at in the present invention become saturated.

The acicular or spindle-shaped $\alpha$-$Fe_2O_3$ particles coated with the coupling agent may be subjected to a treatment such as deaeration, and the mixer such as those described in the dry process (i) is preferably used.

It is more preferable in the present invention to use as precursor particles acicular or spindle-shaped $\alpha$-$Fe_2O_3$ particles coated with an Al compound when coating on acicular or spindle-shaped $\alpha$-$Fe_2O_3$ particles with a coupling agent.

It is also possible to coat on the acicular or spindle-shaped $\alpha$-$Fe_2O_3$ particles with at least one selected from the group consisting of Si, P, Ti, Mn, Ni, Zn, Zr, Sn and Sb compounds together with an Al compound, or to coat on the acicular or spindle-shaped $\alpha$-$Fe_2O_3$ particles coated with Al compound, with at least one selected from the group consisting of Si, P, Ti, Mn, Ni, Zn, Zr, Sn and Sb compounds. The amount of compound which coats on the surface of the acicular or spindle-shaped ($\alpha$-$Fe_2O_3$ particles or the acicular or spindle-shaped $\alpha$-$Fe_2O_3$ particles coated with Al compound, is 0.01 to 50.00 parts by weight, preferably 0.05 to 20.0 parts by weight, more preferably 0.1 to 10.0 parts by weight based on 100 parts by weight of the acicular or spindle-shaped $\alpha$-$Fe_2O_3$ particles or the acicular or spindle-shaped $\alpha$-$Fe_2O_3$ particles coated with Al compound. If the amount is less than 0.01 part by weight, the dispersion in the binder resin is insufficient, while the amount exceeding 50.00 parts by weight is unfavorable, because the compounds floating outside the surfaces of the particles interact. The total amount of the coating compounds such as Al, Si, P, Ti, Mn, Ni, Zn, Zr, Sn and Sb compounds in the coated acicular or spindle-shaped $\alpha$-$Fe_2O_3$ particles in the present invention is 0.01 to 50.0 wt %, preferably 0.05 to 20.0 wt % more preferably 0.1 to 10.0 wt %.

The average major axis diameter of the coated acicular or spindle-shaped $\alpha$-$Fe_2O_3$ particles in the present invention is 0.05 to 0.25 µm, preferably 0.1 to 0.25 µm, the minor axis diameter thereof is 0.010 to 0.035 µm, preferably 0.015 to 0.030 µm, the particle size distribution thereof in geometrical standard deviation is not more than 1.40, preferably not more than 1.39 and the aspect ratio (major axis diameter/ minor axis diameter) thereof is 2 to 20 preferably 3 to 17.

If the average major axis diameter is less than 0.05 µm, the dispersion in the binder is difficult. On the other hand, if the average major axis diameter exceeds 0.25 µm, the particle size is so large as to impair the surface smoothness.

If the average minor axis diameter is less than 0.010 µm, the dispersion in the binder is unfavorably difficult. On the other hand, if the average minor axis diameter exceeds 0.035 µm, the particle size is so large as to impair the surface smoothness.

If the particle size distribution in geometrical standard deviation exceeds 1.40, the coarse particles exert deleterious influence on the surface smoothness of the coated film.

If the aspect ratio is less than 2, it is difficult to provide the coated film with the desired strength. On the other hand, if the aspect ratio exceeds 20, the interaction between the particles increases so much as to exert deleterious influence on the dispersion.

As the binder resin in the present invention, resins which are at present generally used for the production of a magnetic recording medium are usable. For example, vinyl chloride-vinyl acetate copolymer, urethane resin, vinyl chloride-vinyl acetate-urethane maleate elastomer, butadiene-acrylonitrile copolymer, polyvinyl butyral, cellulose derivative such as nitrocellulose, polyester, synthetic rubber resin such as polybutadiene, epoxy resin, polyamide, polyisocyanate, electron radiation curing acryl urethane resin and mixtures thereof may be exemplified. Each of these resin binders may contain a polar group such as —OH, —COOH, —$SO_3M$, —$OPO_2M_2$ and —$NH_2$, wherein M represents H, Na or K.

A non-magnetic undercoating layer for a magnetic recording medium according to the present invention is obtained by forming a coating-film composition which contains coated acicular or spindle-shaped $\alpha$-$Fe_2O_3$ particles and a binder resin, on the surface of a non-magnetic substrate. The amount of non-magnetic particles in the undercoating layer is 65 to 95 wt %, preferably 70 to 90 wt %.

It is possible to add a lubricant, an abrasive, an antistatic agent, etc. which are generally used for the production of a magnetic recording medium, to the non-magnetic undercoating layer.

As the non-magnetic substrate, the following materials which are at present generally used for the production of a magnetic recording medium are usable. For example, a synthetic resin film such as polyethylene terephthalate, polyethylene, polypropylene, polycarbonate, polyethylene naphthalate, polyamide, polyamideimide and polyimide; film, foil and plate of a metal such as aluminum and stainless steel; and various kinds of paper may be exemplified. The thickness of the non-magnetic substrate is not restricted, but the thickness thereof is preferably 1 to 20 µm.

The thickness of the undercoating layer obtained by coating on a non-magnetic substrate with a coating-film composition and drying the coating composition is 1 to 10 µm, preferably 2 to 4 µm. If the thickness is less than 1 µm, not only it is impossible to improve the surface roughness of the base film composed of the non-magnetic substrate and the non-magnetic undercoating layer, but also the strength is insufficient. Even if the thickness exceeds 10 µm, the desired properties are obtained, but in order to obtain a thin magnetic recording medium, it is preferable to form an undercoating layer of not more than 10 µm in thickness.

A magnetic recording medium of the present invention is obtained by forming a magnetic coating layer on the non-magnetic undercoating layer for a magnetic recording medium according to the present invention by coating the non-magnetic undercoating layer with a coating-film composition containing non-magnetic particles and a binder resin.

It is possible to add to the non-magnetic undercoating layer, a lubricant, an abrasive, an antistatic agent, etc. which are generally used for the production of a magnetic recording medium.

As the magnetic particles in the magnetic coating (recording) layer are usable magnetic oxide iron particles such as maghemite particles; magnetite particles; berthollide particles as an intermediate oxide of maghemite and magnetite; magnetic iron oxide particles containing an element(s) other than Fe such as Co, Al, Ni, P, Zn, Si and B; magnetic iron oxide particles obtained by coating the magnetic iron oxide particles containing other element(s) with Co, Co and Fe or the like; magnetic metal particles containing iron as the main ingredient; magnetic iron-based alloy particles containing elements other than iron such as Co, Al, Ni, P, Zn, Si, B or the like; plate-like Ba ferrite particles; and plate-like composite ferrite particles containing divalent metal such as Co, Ni and Zn and a quadrivalent metal such as Ti, Sn and Zr as coercive force reducing agents. The shape of the magnetic particles is not specified and, for example, acicular, spindle-shaped, cubic and plate-like particles are usable.

As the binder resin in the magnetic recording layer, the same resin as that used in the formation of the undercoating layer may be used. The thickness of the magnetic coating layer is 0.1 to 4.0 µm, preferably 0.2 to 2.5 µm.

The non-magnetic undercoating layer for a magnetic recording medium according to the present invention is excellent in the surface smoothness and the strength, so that it is possible to obtain a thin magnetic recording layer having a small light transmittance, an excellent surface smoothness and a uniform thickness when a magnetic recording medium is produced by sandwiching the non-magnetic undercoating layer composed of a coating-film composition containing non-magnetic particles and a binder resin, between the non-magnetic substrate and magnetic coating layer.

The reason why the non-magnetic undercoating layer for a magnetic recording medium according to the present invention is excellent in the surface smoothness and the strength is as follows.

It is possible to orient the acicular or spindle-shaped particles at the time of coating, on the surface of a non-magnetic substrate, and the oriented acicular or spindle-shaped particles make the light transmittance of the coating layer small, and enhance the surface smoothness and the strength thereof, as described on p. 339 of *Materials for Synthetic Technology*, " . . . Pigment particles such as acicular-shaped $\alpha$-$Fe_2O_3$ particles which are regarded as rod-like particles, are oriented in parallel to the surface of a substrate when coated with the pigment particles in such a manner that a shearing force is applied thereto . . . The rod-like particles which are oriented parallel to the surface of the substrate have larger hiding power and gloss, and smaller light or gas transmittance than rod-like particles which are oriented vertical to the surface of the substrate. The difference in the orientation of the pigment particles also influences the mechanical properties of the coating film. That is, the closer to the horizontal orientation to the surface of the substrate, the higher the strength is and the smaller the elongation is."

However, the dispersibility of the acicular or spindle-shaped particles is a problem, as described on p. 343 of *Materials for Synthetic Technology*, "... If the dispersibility of the magnetic particles is poor, not only is the surface smoothness deteriorated but also the orientation is influenced so that the magnetic characteristics are deteriorated . . ."

As a result of examination of various non-magnetic acicular or spindle-shaped particles which can enhance the surface smoothness and the strength, it is considered by the present inventors that by using the same iron oxide particles as the magnetic particles used in the magnetic recording layer as the non-magnetic particles for the undercoating layer for a magnetic recording medium, the conformity with a binder resin is enhanced when coated on the base film, and that the adhesiveness and the durability are also increased. For this reason, acicular or spindle-shaped $\alpha$-$Fe_2O_3$ particles are selected as the non-magnetic particles.

However, since it is impossible to obtain a sufficient orientation, an excellent surface smoothness or an adequate strength by coating on the non-magnetic substrate with a composition obtained by dispersing acicular or spindle-shaped $\alpha$-$Fe_2O_3$ particles in a resin binder, various studies have been undertaken in order to make acicular or spindle-shaped $\alpha$-$Fe_2O_3$ particles which are easy to disperse in the binder resin. As a result, it has been found that the desired properties are obtained by using acicular or spindle-shaped $\alpha$-$Fe_2O_3$ particles coated with at least one selected from the group consisting of an Al compound, a silane coupling agent, a titanate coupling agent, an aluminate coupling agent and a zirconate coupling agent.

Namely, the dispersibility of the thus-obtained coated non-magnetic acicular or spindle-shaped $\alpha$-$Fe_2O_3$ particles in the coating-film composition is improved, and when the non-magnetic substrate is coated with the coating-film composition, the mechanical orientation on the non-magnetic substrate is smooth, so that the non-magnetic undercoating layer for a magnetic recording medium obtained has an excellent surface smoothness and a high strength.

That is, such a good result is obtained because the acicular or spindle-shaped $\alpha$-$Fe_2O_3$ particles coated with an Al compound and/or the above-described coupling agent improves the conformity with the binder resin and, hence, the dispersibility and orientation. In addition, it is considered that since the surface activity of the coated non-magnetic acicular or spindle-shaped $\alpha$-$Fe_2O_3$ particles is reduced by the Al compound and/or the coupling agent present on the surfaces of the particles, the solvent present in the neighborhood of the surface of the particles is severable therefrom, and as a result, the solvent is sufficiently removed from the dried coating film and the amount of remaining carbon is reduced, which are considered to exert favorable influence on the surface smoothness and the strength.

It has also been found that in the case where the acicular or spindle-shaped $\alpha$-$Fe_2O_3$ particles coated with an Al compound is further coated with the above-described coupling agent, more excellent advantages are obtained and the conformity with the binder resin is further improved.

The average major axis diameter of the non-magnetic particles in the present invention is 0.05 to 0.25 µm, preferably 0.1 to 0.25 µm; the average minor axis diameter is 0.010 to 0.035 µm, preferably 0.015 to 0.030 µm; the aspect ratio (average major axis diameter/average minor axis diameter) is 2 to 20, preferably 3 to 17; the particle size distribution thereof in geometrical standard deviation is not more than 1.40, preferably not more than 1.39; the BET specific surface area is not more than 70 $m^2$/g, preferably not more than 51.0 $m_2$/g; the specific resistance to filtration ($\alpha$V) is not more than $10_{13}$ m/kg, preferably not more than $10_{12}$ m/kg; and the amount of carbon remaining after the solvent is removed is not more than 0.5 wt %, preferably not less than 0.45 wt %.

In the non-magnetic undercoating layer of the present invention, the gloss (45°) of the coating film is not less than 160%, preferably not less than 165%; the surface roughness (Ra) is not more than 17 nm, preferably not more than 15 nm; and the Young's modulus (relative value) is not less than 100, preferably not less than 110.

In the magnetic recording medium of the present invention, the coercive force (Hc) is not less than 500 Oe, preferably not less than 600 Oe; the squareness is not less than 0.85, preferably not less than 0.87; the gloss (45°) is not less than 170%, preferably not less than 175%; the surface roughness (Ra) is not more than 10 nm, preferably not more than 8 nm; the Youngg's modulus (relative value) is not less than 120, preferably not less than 125; and the linear absorption coefficient is not less than 1.15 $\mu m^{-1}$, preferably not less than 1.20 $\mu m^{-1}$.

The non-magnetic undercoating layer for a magnetic recording medium, which contains non-magnetic particles is excellent in the strength and the surface properties as a base film. Therefore, a magnetic recording medium having this non-magnetic undercoating layer has a small light transmittance, a smooth surface and a uniform thickness.

In addition, by coating the acicular or spindle-shaped $\alpha$-$Fe_2O_3$ particles with the Al compound and/or the above-described coupling agent, the filtration properties after the coating and washing treatments are improved, so that the operability is greatly improved.

EXAMPLES

The present invention will now be described in more detail with reference to the following examples and comparative examples.

The average major axis diameter, the average minor axis diameter and the aspect ratio of the particles in each of the following examples and comparative examples are expressed by the average values measured in electron microphotographs.

The particle size distribution of the particles is expressed by the geometrical standard deviation ($\sigma$g) obtained by the following method. The major axis diameters of 350 particles in an electron microphotograph of 120,000 magnification were measured. The actual major axis diameters of the particles and the number thereof were obtained from the calculation on the basis of the measured values. In logarithmico-normal probability paper, the major axis diameters are plotted at regular intervals on the abscissa-axis and the accumulative number of particles belonging to each interval of the major axis diameters was plotted by percentage on the ordinate-axis by a statistical technique. The major axis diameters corresponding to the number of particles of 50% and 84.13%, respectively, were read from the graph, and the geometrical standard deviation ($\sigma$g) was measured from the following formula:

Geometrical standard deviation ($\delta$g) = (major axis diameter (µm) corresponding to the number of particles of 50%) / (major axis diameter (µm) corresponding to the number of particles of 84.13%)

The specific surface area is expressed by the value measured by a BET method using HONOSORB MODEL MS, manufactured by Quanta Chroma Corp.

The amount of Al and the amount of each element with which the acicular or spindle-shaped $\alpha$-Fe$_2$O$_3$ particles are coated were measured by fluorescent X-ray analysis using X-RAY SPECTROMETER No. 3134 manufactured by Rigaku Industries Corp.

The amount of removed solvent is expressed by the amount of remaining carbon (C). A sample powder was immersed adequately in a solvent (MEK), and thereafter the sample was dried at a temperature of 60° C. for 24 hours. The amount of carbon (C) remaining in the dried sample powder was measured by quantitative analysis using "Carbon/Sulfur Analyzer EMIA-2200", manufactured by Kabushiki Kaisha Horiba Seisakusho. The smaller the amount of remaining carbon (C), the more preferable, because the strong interaction of the solvent is the smaller.

The amount of coupling agent with which the acicular or spindle-shaped $\alpha$-Fe$_2$O$_3$ particles are coated, were calculated as C by measuring the carbon contained in the acicular or spindle-shaped $\alpha$-Fe$_2$O$_3$ particles by "Carbon/Sulfur Analyzer EMIA-2200", manufactured by Kabushiki Kaisha Horiba Seisakusho.

The gloss of the coating film was obtained by measuring the gloss at 45° by "Glossmeter UGV-5D", manufactured by Suga Shikenki Co., Ltd.

The surface roughness (Ra) was expressed by the center-line average roughness of the profile curve of the surface of the coating film by using "Surfcom-575A", manufactured by Tokyo Seimitsu Co., Ltd.

The specific resistance of filtration ($\alpha$V) is measured by a method described in "Manual of Filtration and Compression Techniques", published by Nikkan Kogyo Shinbunsha, pages 3–8.

Namely, the slurry of a temperature of 60° C. and a concentration of 10 wt % was filtrated through a filter having a filtration area of about 123 cm$^2$ under the filtration pressure of –500 mmHg (absolute pressure: 260 mmHg) to obtain a filtrate of the viscosity of 0.5 cps and the density of 1 g/cm$^3$ at a room temperature. From the relationship of the amount of the filtrate and the filtration time, the specific resistance of filtration ($\alpha$V) was determined.

The strength of the coating film was obtained by measuring the Youngg's modulus by using "Autograph", manufactured by Shimazu Seisakusho Ltd. The Youngg's modulus in the present invention is expressed by a relative value based on the Youngg's modulus of the commercial video tape, AV T-120 (manufactured by Victor Company of Japan, Limited).

The magnetic characteristics were measured by using "Vibration Sample Magnetometer VSM-3S-15", manufactured by Toei Kogyo Kabushiki Kaisha and applying an external magnetic field up to 10 kOe.

The light transmittance of a magnetic sheet is expressed by the linear adsorption coefficient measured by using "Photoelectric Spectrophotometer UV-2100", manufactured by Shimazu Seisakusho Ltd. The linear adsorption coefficient is defined by the following formula, and the larger the value, the more difficult it is for the magnetic sheet to transmit light.

---

Linear Adsorption Coefficient ($\mu$m$^{-1}$) = 1 n (1/t)FT
(wherein t is a light transmittance (%) at $\lambda$ = 900 non-magnetic, and FT is a thickness ($\mu$m) of the coating-film composition of the film used for the measurement)

---

If the linear adsorption coefficient is not less than 1.2 (film thickness: 4.0 $\mu$m), it satisfies the light transmittance of not more than 0.8% determined by the VHS standard.

<Production of acicular or spindle-shaped ($\alpha$-Fe$_2$O$_3$>

Examples 1 to 22 and

Comparative Examples 1 to 8

Example 1

10 kg of spindle $\alpha$-FeOOH particles (average major axis diameter: 0.21 $\mu$m, average minor axis diameter: 0.021 $\mu$m, aspect ratio: 10.0, BET specific surface area: 110.0 m$^2$/g) were charged into a retort with one end open, and heated and dehydrated at a temperature of 470° C. for 60 minutes in air while the container was rotated. The particles were further annealed at a temperature of 650° C. for 120 minutes, thereby obtaining spindle $\alpha$-Fe$_2$O$_3$ particles.

The thus-obtained spindle $\alpha$-Fe$_2$O$_3$ particles had an average major axis diameter of 0.15 $\mu$m, an average minor axis diameter of 0.025 $\mu$m and a BET specific surface area of 52.5 m$^2$/g.

The obtained spindle $\alpha$-Fe$_2$O$_3$ particles were then pulverized in a dry-process by an edge runner-type pulverizer (Sand mill, manufactured by Kabushiki Kaisha Matsumoto Chuzo Tekkosho). The pulverized particles were stirred and mixed in water and then pulverized in a wet-process by a line mill-type pulverizer (Homomic Line Mill, manufactured by Tokushukika Kogyo Kabushiki Kaisha), thereby obtaining a suspension containing the spindle $\alpha$-Fe$_2$O$_3$ particles.

After adding 1320 ml (corresponding to 1.78 parts by weight (calculated as Al) based on 100 parts by weight of the spindle $\alpha$-Fe$_2$O$_3$ particles) of aqueous aluminum sulfate solution of 2.5 mol/l to the suspension obtained, aqueous NaOH solution of 1 mol/l was added to adjust the pH to 6.0, and the resultant mixture was stirred for 30 minutes.

After the mixture was stirred, it was filtered, washed with water and dried by an ordinary method, and then compacted by an edge runner-type pulverizer (Sand mill, manufactured by Kabushiki Kaisha Matsumoto Chuzo Tekkosho).

The thus-obtained spindle $\alpha$-Fe$_2$O$_3$ particles coated with the Al compound had an average major axis diameter of 0.15 $\mu$m, an average minor axis diameter of 0.026 $\mu$m, an aspect ratio of 5.8, a particle size distribution in geometrical standard deviation of 1.35 and a BET specific surface area of 51.8 m$^2$/g. The pH of the particles was 6.3.

The filtration characteristic was evaluated by the time which took for obtaining 200 cc of the filtrate under a negative pressure of 50 cm Hg by using No. 5 filter paper having a filtration area of 122.7 cm$^2$. The filtration time was 2.6 minutes.

Examples 2 to 22 and Comparative Examples 1 to 8

Acicular or spindle-shaped $\alpha$-Fe$_2$O$_3$ particles were produced in the same way as in Example 1 except for varying the kind of particles to be coated, the kind and the amount of Al compound added, the kind and the amount of other compound added and the pH of the suspension.

The particles obtained in Examples 1 to 3 and 8 to 16 were spindle $\alpha$-Fe$_2$O$_3$ particles and the particles obtained in Examples 4 to 7 were acicular $\alpha$-F$_2$O$_3$ particles.

In Comparative Examples 5 and 6, spindle $\alpha$-FeOOH particles were used as particles to be coated in place of spindle $\alpha$-Fe$_2$O$_3$ particles, and in Comparative Examples 7 and 8, spindle α-Fe₂O₃ particles obtained by heat-treating magnetite particles were used as particles to be coated.

The main producing conditions and various properties of the products are shown in Tables 1 and 2.

<Production of non-magnetic undercoating layer for magnetic recording medium>

Examples 23 to 44 and Comparative Examples 9 to 16

Examples 23

The coated spindle α-Fe₂O₃ particles obtained in Example 1 were first mixed with a binder resin and a solvent so that the solid content was 75 wt %, and the resultant mixture was kneaded for 30 minutes by a Brabender Plasticorder. Thereafter, a predetermined amount of kneaded product was taken out and charged into a glass bottle together with glass beads and a solvent. The mixture was stirred and dispersed for 6 hours by a paint conditioner.

The final composition of the non-magnetic paint obtained was as follows:

| | |
|---|---|
| Al-coated spindle α-Fe₂O₃ particles | 100 parts by weight |
| Vinyl chloride-vinyl acetate copolymer having a sodium sulfonate group | 10 parts by weight |
| Polyurethane having a carboxyl group | 10 parts by weight |
| Cyclohexanone | 40.9 parts by weight |
| Methyl ethyl ketone | 102.2 parts by weight |
| Toluene | 61.3 parts by weight |

The non-magnetic paint obtained was applied to polyethylene terephthalate film having a thickness of 14 μm so as to have a thickness of 55 μm by using an applicator, and dried to obtain a sheet-like specimen.

The sheet-like specimen had a Young's modulus of 121, a gloss of 182% and a surface roughness (Ra) of 11.2 nm.

Examples 24 to 44 and Comparative Examples 9 to 16

Non-magnetic undercoating layers for a magnetic recording medium were produced in the same way as in Example 23 by using the acicular or spindle α-Fe₂O₃ particles obtained in Examples 2 to 22 and Comparative Examples 1 to 8 and acicular or spindle α-FeOOH particles obtained in Comparative Examples 5 and 6, respectively.

Various properties of the products are shown in Tables 5 and 6.

<Production of magnetic tape>

Examples 45 to 50 and Comparative Examples 17 to 20

Example 45

Co-coated magnetic iron oxide particles (average major axis diameter: 0.20 μm, average minor axis diameter: 0.029 μm, aspect ratio: 6.8, particle size distribution in geometrical standard deviation: 1.38, BET specific surface area: 48.2 m²/g) were first mixed with a binder resin and a solvent so that the solid content was 76 wt %, an the resultant mixture was kneaded for 30 minutes by a Brabender Plasti-corder. Thereafter, a predetermined amount of kneaded product was taken out and charged into a glass bottle together with glass beads and a solvent. The mixture was stirred and dispersed for 6 hours by a paint conditioner.

Thereafter, an abrasive, a lubricant and a hardener were added thereto, and the resultant mixture was further stirred and dispersed for 15 minutes. The magnetic paint obtained was as follows:

| | |
|---|---|
| Co-coated magnetic iron oxide particles | 100 parts by weight |
| Vinyl chloride-vinyl acetate copolymer having a sodium sulfonic acid group | 10 parts by weight |
| Polyurethane having a sodium sulfonate group | 10 parts by weight |
| Abrasive | 10 parts by weight |
| Lubricant | 2.5 parts by weight |
| Hardener | 5 parts by weight |
| Cyclohexanone | 52.2 parts by weight |
| Methyl ethyl ketone | 130.5 parts by weight |
| Toluene | 78.3 parts by weight |

The magnetic paint obtained was applied to the undercoat layer formed thereon in Example 23 so as to have a thickness of 15 μm by using an applicator and dried to obtain a sheet-like sample.

The sheet-like sample was calendered, and cured at a temperature of 60° C. for 24 hours. The sheet-like sample was then slit to a width of 0.5 inch to obtain a magnetic tape.

The magnetic tape obtained had a coercive force (Hc) of 889 Oe, a squareness of 0.89, a gloss of 178%, a surface roughness (Ra) of 6.0 nm, a Young's modulus of 133, and a linear adsorption coefficient of 1.21.

Examples 46 to 50 and Comparative Examples 17 to 20

Magnetic recording media were produced in the same way as in Example 45 by using the undercoating layers for a magnetic recording medium obtained in Examples 23, 30 and 43 and Comparative Examples 9 and 14.

Various properties of the products are shown in Table 7.

<Production of acicular or spindle α-F₂O₃>

Sample Productions 1 to 20

Sample Production 1

10 kg of spindle α-FeOOH particles (average major axis diameter: 0.21 μm, average minor axis diameter: 0.021 μm, aspect ratio: 10.0, BET specific surface area: 110.0 m²/g) were charged into a retort with one end open, and heated and dehydrated at a temperature of 470° C. for 60 minutes in air, while the container was rotated. The particles were further annealed at a temperature of 650° C. for 120 minutes, thereby obtaining spindle α-Fe₂O₃ particles.

The thus-obtained spindle α-Fe₂O₃ particles had an average major axis diameter of 0.14 μm, an average minor axis diameter of 0.025 μm and a BET specific surface area of 52.0 m²/g.

Sample Productions 2 to 20

Acicular or spindle α-Fe₂O₃ particles were produced in the same way as Sample Production 1 except for varying the kind of particles to be coated.

The particles obtained in Sample Productions 1, 3 to 8 were spindle α-Fe₂O₃ particles and the particles obtained in Sample Productions 2 and 9 to 12 were acicular α-Fe₂O₃ particles.

In Sample Productions 17 and 18, acicular α-FeOOH particles were used as they are stand, and in Sample Productions 19 and 20, acicular α-Fe₂O₃ particles obtained by heat-treating magnetite particles were used instead of acicular α-$Fe_2O_3$ particles.

The main producing conditions and various properties of the products are shown in Tables 8 and 9.

<Coating of acicular or spindle α-$Fe_2O_3$ particles with Al compound etc.>

Examples 51 to 56 and Comparative Examples 21 and 22

Example 51

The spindle α-$Fe_2O_3$ particles obtained as Sample Production 7 were then pulverized in a dry-process by an edge runner-type pulverizer (Sand mill, manufactured by Kabushiki Kaisha Matsumoto Chuzo Tekkosho). The pulverized particles were stirred and mixed in water and then pulverized in a wet process by a line mill-type pulverizer (Homomic Line Mill, manufactured by Tokushuki Kogyo Kabushikika Kaisha), thereby obtaining a suspension (slurry concentration: 100 g/l) containing the spindle α-$Fe_2O_3$ particles.

After adding 463 ml (corresponding to 0.50 part by weight (calculated as Al) based on 100 parts by weight of the spindle α-$Fe_2O_3$ particles) of an aqueous sodium aluminate solution having a concentration of 2 mol/l to the 50 l (corresponding to 5000 g calcuglated as dried particles) of the suspension obtained, an aqueous HCl solution having a concentration of 1 mol/l was added to adjust the pH to 7.0, and the resultant mixture was stirred for 30 minutes.

After the mixture was stirred, it was filtered, washed with water and dried by an ordinary method to obtain spindle α-$Fe_2O_3$ particles coated with the Al compound.

The thus-obtained spindle α-$Fe_2O_3$ particles coated with the Al compound had an average major axis diameter of 0.16 μm, an average minor axis diameter of 0.025 μm, an aspect ratio of 6.4, a particle size distribution in geometrical standard deviation of 1.34 and a BET specific surface area of 52.3 $m^2/g$. The pH of the powder was 7.5.

Examples 52 to 56 and Comparative Examples 21 and 22

Acicular or spindle α-$Fe_2O_3$ particles were produced in the same way as in Example 51 except for varying the kind of particles to be coated, the kind and the amount of Al compound added, the kind and the amount of other compound added and the pH of the suspension.

The main producing conditions and various properties of the products are shown in Table 10.

<Surface treatment of acicular or spindle α-$Fe_2O_3$ particles with by coupling agent>

Examples 57 to 68 and Comparative Examples 23 to 30

Example 57

1000 g of the spindle α-$Fe_2O_3$ particles obtained as Sample Production 1 and 10 g (1.0 part by weight based on 100 parts by weight of the spindle α-$Fe_2O_3$ particles) of γ-aminopropyltrimethoxysilane (A-1100: trade name, produced by Nippon Unicar Co., Ltd.) were charged into a Henschel mixer manufactured by Mitsui Miike Kagaku Koki Kabushiki Kaisha) and the mixer was driven for 20 minutes to coat the spindle α-$Fe_2O_3$ particles with the silane coupling agent.

The amount of silane coupling agent existent on the surface of the coated particles was 0.48 part by weight based on 100 parts by weight of the spindle α-$Fe_2O_3$ particles. The coated particles had an average major axis diameter of 0.15 μm, an average minor axis diameter of 0.026 μm, an aspect ratio of 5.8, a particle size distribution in geometrical standard deviation of 1.35 and a BET specific surface area of 48.6 $m^2/g$.

Example 58

500 g of the acicular α-$Fe_2O_3$ particles obtained as Sample Production 2 were dispersed in 5 liter of ethanol and 100 g (2 parts by weight based on 100 parts by weight of the acicular α-$Fe_2O_3$ particles) of ethanol solution of 10 wt % of vinyltriethoxysilane (A-151: trade name, produced by Nippon Unicar Co., Ltd.) was added to the dispersion. The resultant mixture was stirred to coat the acicular α-$Fe_2O_3$ particles with the silane coupling agent. The dispersion was then filtered and dried, and the particles obtained were compacted by an edge runner-type pulverizer (Sand mill, manufactured by Kabushiki Kaisha. Matsumoto Chuzo Tekkosho). Thus coated particles were obtained.

The amount of silane coupling agent existent on the surfaces of the coated particles was 1.01 parts by weight based on 100 parts by weight of the acicular α-$Fe_2O_3$ particles. The coated particles had an average major axis diameter of 0.21 μm, an average minor axis diameter of 0.031 μm, an aspect ratio of 6.8, a particle size distribution in geometrical standard deviation of 1.38 and a BET specific surface area of 36.6 $m^2/g$.

Example 59

500 g of the spindle α-$Fe_2O_3$ particles obtained as Sample Production 3 were dispersed in 5 liter of water and 25 g (0.5 part by weight based on 100 parts by weight of the spindle α-$Fe_2O_3$ particles) of an aqueous solution of 10 wt % of isopropyltri (N-aminoethyl-aminoethyl) titanate (KR-44: trade name, produced by Ajinomoto Co., Ltd.) was added to the dispersion. After the resultant mixture was stirred, an aqueous $NH_4OH$ solution was added thereto to adjust the pH to 7.0, thereby coating the spindle α-$Fe_2O_3$ particles with the titanate coupling agent. The dispersion was then filtered, dried and the particles obtained were compacted by an edge runner-type pulverizer (Sand mill, manufactured by Kabushiki Kaisha Matsumoto Chuzo Tekkosho). Thus coated particles were obtained.

The amount of titanate coupling agent existent on the surface of the coated particles was 0.21 part by weight based on 100 parts by weight of the spindle α-$Fe_2O_3$ particles. The coated particles had an average major axis diameter of 0.16 μm, an average minor axis diameter of 0.026 μm, an aspect ratio of 6.2, a particle size distribution in geometrical standard deviation of 1.35 and a BET specific surface area of 50.0 $m^2/g$.

Examples 60 to 68 and Comparative Examples 23 to 30

Acicular or spindle α-$Fe_2O_3$ particles coated with a coupling agent were produced in the same way as in Example 57, 58 or 59 except for varying the kind of particles to be coated, the kind and the amount of coupling agent added and the pH of the dispersion.

In Comparative Examples 23 to 30, the acicularor spindle α-$Fe_2O_3$ particles were not coated with a coupling agent.

The main producing conditions and various properties of the products are shown in Tables 12 to 13.

<Production of non-magnetic undercoating layer for magnetic recording medium>

Examples 69 to 80 and Comparative Examples 31 to 38

Example 69

The coated spindle $\alpha$-$Fe_2O_3$ particles obtained in Example 57 were first mixed with a binder resin and a solvent so that the solid content was 75 wt %, an the resultant mixture was kneaded for 30 minutes by a Brabender Prasti-corder. Thereafter, a predetermined amount of kneaded product was taken out and charged into a glass bottle together with glass beads and a solvent. The mixture was stirred and dispersed for 6 hours by a paint conditioner. The final composition of the non-magnetic paint obtained was as follows:

| | |
|---|---|
| Coupling agent-coated spindle $\alpha$-$Fe_2O_3$ particles | 100 parts by weight |
| Vinyl chloride-vinyl acetate copolymer having a sodium sulfonate group | 10 parts by weight |
| Polyurethane having a carboxyl group | 10 parts by weight |
| Cyclohexanone | 40.9 parts by weight |
| Methyl ethyl ketone | 102.2 parts by weight |
| Toluene | 61.3 parts by weight |

The non-magnetic paint obtained was applied to polyethylene terephthalate film having a thickness of 14 μm so as to have a thickness of 55 μm by using an applicator, and dried to obtain a sheet-like sample. The sheet-like sample had a Young's modulus of 138, a gloss of 168% and a surface roughness (Ra) of 14.4 nm.

Examples 70 to 80 and Comparative Examples 31 to 38

Non-magnetic undercoating layers for a magnetic recording medium were produced in the same way as in Example 69 by using the acicular or spindle $\alpha$-$Fe_2O_3$ particles obtained in Examples 58 to 68 and Comparative Examples 23 to 30 and acicular or spindle $\alpha$-FeOOH particles in Comparative Examples 27 and 28, respectively.

Various properties of the products are shown in Tables 14 and 15.

<Production of magnetic tape>

Examples 81 to 86 and Comparative Examples 39 to 42

Example 81

Co-coated magnetic iron oxide particles (average major axis diameter: 0.20 μm, average minor axis diameter: 0.029 μm, aspect ratio: 6.8, particle size distribution in geometrical standard deviation: 1.38, BET specific surface area: 48.2 $m^2/g$) were first mixed with a binder resin and a solvent so that the solid content was 76 wt %, and the resultant mixture was kneaded for 30 minutes by a Brabender Plasti-corder. Thereafter, a predetermined amount of kneaded product was taken out and charged into a glass bottle together with glass beads and a solvent. The mixture was stirred and dispersed for 6 hours by a paint conditioner.

Thereafter, an abrasive, a lubricant and a hardener solution were added, and the mixture was further stirred and dispersed for 15 minutes. The magnetic paint obtained was as follows:

| | |
|---|---|
| Co-coated magnetic iron oxide particles | 100 parts by weight |
| Vinyl chloride-vinyl acetate copolymer having a sodium sulfonate group | 10 parts by weight |
| Polyurethane having a sodium sulfonate group | 10 parts by weight |
| Abrasive | 10 parts by weight |
| Lubricant | 2.5 parts by weight |
| Hardner | 5 parts by weight |
| Cyclohexanone | 52.2 parts by weight |
| Methyl ethyl ketone | 130.5 parts by weight |
| Toluene | 78.3 parts by weight |

The magnetic paint obtained was applied to the non-magnetic undercoating layer formed thereon in Example 69, so as to have a thickness of 15 μm by using an applicator and dried to obtain a sheet-like sample. The sheet-like sample was calendered, and cured at a temperature of 60° C. for 24 hours. The sheet-like sample was then slit to a width of 0.5 inch to obtain a magnetic tape.

The magnetic tape obtained had a coercive force (Hc) of 882 Oe, a squareness of 0.88, a gloss of 172%, a surface roughness (Ra) of 7.2 nm, a Young's modulus of 147, and a linear adsorption coefficient of 1.21.

Examples 82 to 86 and Comparative Examples 39 to 42

Magnetic recording media were produced in the same way as in Example 81 by using the undercoating layers for a magnetic recording medium obtained in Examples 69, 75 and 76 and Comparative Examples 31 and 36.

Various properties of the products are shown in Table 16.

TABLE 1

| | Production of acicular or spindle α-Fe₂O₃ particles | | | | | | | |
|---|---|---|---|---|---|---|---|---|
| | Acicular or spindle α-FeOOH | | | | Dehydration | | Annealing | |
| | | | | BET | | | | |
| Examples and Comp. Examples | Major axis diameter (μm) | Minor axis diameter (μm) | Aspect ratio (—) | specific surface area (m²/g) | Temperature (°C.) | Time (min) | Temperature (°C.) | Time (min) |
| Example | | | | | | | | |
| 1 | 0.21 | 0.021 | 10.0 | 110.0 | 470 | 60 | 650 | 120 |
| 2 | 0.21 | 0.021 | 10.0 | 110.0 | 470 | 60 | 650 | 120 |
| 3 | 0.21 | 0.021 | 10.0 | 110.0 | 470 | 60 | 650 | 120 |
| 4 | 0.25 | 0.023 | 10.9 | 75.3 | 470 | 60 | 650 | 120 |
| 5 | 0.25 | 0.023 | 10.9 | 75.3 | 470 | 60 | 650 | 120 |
| 6 | 0.30 | 0.026 | 11.5 | 46.2 | 470 | 60 | 650 | 120 |
| 7 | 0.30 | 0.026 | 11.5 | 46.2 | 470 | 60 | 650 | 120 |
| 8 | 0.21 | 0.021 | 10.0 | 110.0 | 470 | 60 | 650 | 120 |
| 9 | 0.21 | 0.021 | 10.0 | 110.0 | 470 | 60 | 650 | 120 |
| 10 | 0.21 | 0.021 | 10.0 | 110.0 | 470 | 60 | 650 | 120 |
| 11 | 0.21 | 0.021 | 10.0 | 110.0 | 470 | 60 | 650 | 120 |
| 12 | 0.21 | 0.021 | 10.0 | 110.0 | 470 | 60 | 650 | 120 |
| 13 | 0.21 | 0.021 | 10.0 | 110.0 | 470 | 60 | 650 | 120 |
| 14 | 0.21 | 0.021 | 10.0 | 110.0 | 470 | 60 | 650 | 120 |
| 15 | 0.21 | 0.021 | 10.0 | 110.0 | 470 | 60 | 650 | 120 |
| 16 | 0.21 | 0.021 | 10.0 | 110.0 | 470 | 60 | 650 | 120 |

| | Production of coated acicular or spindle α-Fe₂O₃ particles | | | | | | |
|---|---|---|---|---|---|---|---|
| | Coating Al compound | | | Other coating compounds | | | |
| | | Al content (wt %) | pH of suspension | Kind | Element added | Amount of element added | pH of suspension |
| | Kind | | | | | | |
| Example | | | | | | | |
| 1 | Al₂(SO₄)₃ | 1.78 | 6.0 | — | — | — | — |
| 2 | NaAlO₂ | 5.00 | 8.0 | — | — | — | — |
| 3 | NaAlO₂ | 10.00 | 7.0 | — | — | — | — |
| 4 | AlCl₃ | 0.50 | 7.0 | — | — | — | — |
| 5 | Al₂(SO₄)₃ | 5.00 | 7.0 | — | — | — | — |
| 6 | Al₂(SO₄)₃ | 10.00 | 6.0 | — | — | — | — |
| 7 | Al₂(SO₄)₃ | 40.00 | 6.0 | — | — | — | — |
| 8 | Al₂(SO₄)₃ | 3.56 | 7.0 | No. 3 water glass | Si | 1.0 | 7.0 |
| 9 | Al₂(SO₄)₃ | 3.56 | 7.0 | No. 3 water glass | Si | 2.0 | 6.0 |
| 10 | NaAlO₂ | 5.00 | 7.0 | No. 3 water glass | Si | 10.0 | 7.0 |
| 11 | NaAlO₂ | 5.00 | 7.0 | No. 3 water glass | Si | 40.0 | 6.0 |
| 12 | Al₂(SO₄)₃ | 3.56 | 6.0 | Sodium hexametaphosphate | P | 1.0 | 7.0 |
| 13 | NaAlO₂ | 2.00 | 8.0 | Titanyl sulfate | Ti | 5.0 | 7.0 |
| 14 | AlCl₃ | 5.00 | 7.0 | Manganese sulfate | Mn | 3.2 | 7.0 |
| 15 | Al₂(SO₄)₃ | 4.32 | 8.0 | Nickel sulfate | Ni | 5.0 | 7.0 |
| 16 | Al₂(SO₄)₃ | 3.56 | 7.0 | Zinc sulfate | Zn | 4.0 | 7.0 |

TABLE 2

Production of acicular or spindle α-Fe₂O₃ particles

| | Acicular or spindle α-FeOOH | | | | Dehydration | | Annealing | |
|---|---|---|---|---|---|---|---|---|
| Examples and Comp. Examples | Major axis diameter (μm) | Minor axis diameter (μm) | Aspect ratio (—) | BET specific surface area (m²/g) | Temperature (°C.) | Time (min) | Temperature (°C.) | Time (min) |
| Example | | | | | | | | |
| 17 | 0.21 | 0.021 | 10.0 | 110.0 | 470 | 60 | 650 | 120 |
| 18 | 0.21 | 0.021 | 10.0 | 110.0 | 470 | 60 | 650 | 120 |
| 19 | 0.21 | 0.021 | 10.0 | 110.0 | 470 | 60 | 650 | 120 |
| 20 | 0.21 | 0.021 | 10.0 | 110.0 | 470 | 60 | 650 | 120 |
| 21 | 0.21 | 0.021 | 10.0 | 110.0 | 470 | 60 | 650 | 120 |
| 22 | 0.21 | 0.021 | 10.0 | 110.0 | 470 | 60 | 650 | 120 |
| Comp. Example | | | | | | | | |
| 1 | 0.21 | 0.021 | 10.0 | 110.0 | 470 | 60 | 650 | 120 |
| 2 | 0.25 | 0.023 | 10.9 | 75.3 | 470 | 60 | 650 | 120 |
| 3 | 0.30 | 0.026 | 11.5 | 46.2 | 470 | 60 | 650 | 120 |
| 4 | 0.21 | 0.021 | 10.0 | 110.0 | 470 | 60 | 650 | 120 |
| 5 | 0.21 | 0.021 | 10.0 | 110.0 | — | — | — | — |
| 6 | 0.25 | 0.023 | 10.9 | 75.3 | — | — | — | — |
| 7 | *0.17 | 0.12 | 1.4 | 13.8 | — | — | — | — |
| 8 | *0.34 | 0.28 | 1.2 | 6.7 | — | — | — | — |

(Note) *: α-Fe₂O₃ particles obtained by heat-treating magnetite particles were used Production of coated acicular or spindle α-Fe₂O₃ particles

| | Coating Al compound | | | Other coating compounds | | | |
|---|---|---|---|---|---|---|---|
| | | Al content (wt %) | pH of suspension | | Element added | Amount of element added | pH of suspension |
| | Kind | | | Kind | | | |
| Example | | | | | | | |
| 17 | Al₂(SO₄)₃ | 3.56 | 7.0 | Zirconium sulfate | Zr | 5.0 | 7.0 |
| 18 | Al₂(SO₄)₃ | 3.56 | 7.0 | Zirconia sol | Zr | 5.0 | 7.0 |
| 19 | Al₂(SO₄)₃ | 3.56 | 7.0 | Soda stannate | Sn | 10.0 | 7.0 |
| 20 | NaAlO₂ | 2.00 | 8.0 | Antimony sol | Sb | 10.0 | 7.0 |
| 21 | Al₂(SO₄)₃ | 3.56 | 7.0 | No. 3 water glass + zirconia sol | Si / Zr | 3.0 / 2.0 | 7.0 / 7.0 |
| 22 | NaAlO₂ | 5.00 | 7.0 | Sodium hexametaphosphate + Zinc sulfate | P / Zn | 1.0 / 1.0 | 7.0 / 7.0 |
| Comp. Example | | | | | | | |
| 1 | — | — | — | — | — | — | — |
| 2 | — | — | — | — | — | — | — |
| 3 | Al₂(SO₄)₃ | 0.005 | 7.0 | — | — | — | — |
| 4 | NaAlO₂ | 80.0 | 7.0 | — | — | — | — |
| 5 | — | — | — | — | — | — | — |
| 6 | — | — | — | — | — | — | — |
| 7 | — | — | — | — | — | — | — |
| 8 | — | — | — | — | — | — | — |

TABLE 3

Properties of coated acicular or spindle $\alpha$-$Fe_2O_3$ particles

| Examples and Comp. Examples | Major axis diameter (μm) | Minor axis diameter (μm) | Aspect ratio (—) | Geometrical standard deviation (δg) (—) | BET specific surface area (m²/g) | Al content (wt %) |
|---|---|---|---|---|---|---|
| Example | | | | | | |
| 1 | 0.15 | 0.026 | 5.8 | 1.35 | 51.8 | 1.78 |
| 2 | 0.14 | 0.026 | 5.4 | 1.34 | 50.1 | 5.01 |
| 3 | 0.16 | 0.028 | 5.7 | 1.36 | 43.2 | 9.89 |
| 4 | 0.20 | 0.030 | 6.7 | 1.38 | 38.9 | 0.49 |
| 5 | 0.21 | 0.032 | 6.4 | 1.37 | 34.6 | 4.98 |
| 6 | 0.24 | 0.033 | 7.3 | 1.36 | 31.3 | 9.91 |
| 7 | 0.25 | 0.034 | 7.9 | 1.37 | 26.5 | 38.80 |
| 8 | 0.15 | 0.026 | 5.8 | 1.35 | 53.6 | 3.56 |
| 9 | 0.15 | 0.026 | 5.8 | 1.34 | 51.5 | 3.54 |
| 10 | 0.16 | 0.027 | 5.9 | 1.35 | 48.7 | 4.86 |
| 11 | 0.16 | 0.029 | 5.5 | 1.36 | 59.9 | 4.96 |
| 12 | 0.16 | 0.026 | 6.2 | 1.36 | 54.1 | 3.56 |
| 13 | 0.15 | 0.026 | 5.8 | 1.35 | 49.8 | 1.98 |
| 14 | 0.17 | 0.025 | 6.8 | 1.35 | 47.6 | 4.92 |
| 15 | 0.15 | 0.028 | 5.4 | 1.36 | 48.8 | 4.32 |
| 16 | 0.16 | 0.025 | 6.4 | 1.35 | 47.7 | 3.55 |

Properties of coated acicular or spindle $\alpha$-$Fe_2O_3$ particles

| | Other coating elements | | Filtration productivity | | Removal of solvent |
|---|---|---|---|---|---|
| | Kind | Al content (wt %) | Resistance of filtration (αV) (m/kg) | Filtration time (min) | Amount of remaining C (wt %) |
| Example | | | | | |
| 1 | — | — | 4.22 × 10¹¹ | 2.6 | 0.420 |
| 2 | — | — | 8.80 × 10¹¹ | 3.8 | 0.380 |
| 3 | — | — | 1.01 × 10¹² | 7.3 | 0.362 |
| 4 | — | — | 9.87 × 10¹¹ | 5.6 | 0.450 |
| 5 | — | — | 4.86 × 10¹¹ | 2.8 | 0.380 |
| 6 | — | — | 5.26 × 10¹¹ | 3.3 | 0.353 |
| 7 | — | — | 6.23 × 10¹¹ | 3.5 | 0.296 |
| 8 | Si | 0.98 | 8.80 × 10¹¹ | 4.1 | 0.420 |
| 9 | Si | 1.78 | 1.03 × 10¹² | 8.2 | 0.396 |
| 10 | Si | 8.85 | 2.42 × 10¹² | 12.2 | 0.333 |
| 11 | Si | 32.80 | 3.56 × 10¹² | 13.8 | 0.301 |
| 12 | P | 1.01 | 2.11 × 10¹¹ | 3.1 | 0.450 |
| 13 | Ti | 4.98 | 5.23 × 10¹¹ | 3.8 | 0.421 |
| 14 | Mn | 3.02 | 4.21 × 10¹¹ | 4.2 | 0.376 |
| 15 | Ni | 4.86 | 3.56 × 10¹¹ | 3.1 | 0.392 |
| 16 | Zn | 4.00 | 6.24 × 10¹¹ | 3.9 | 0.415 |

TABLE 4

Properties of coated acicular or spindle $\alpha$-$Fe_2O_3$ particles

| Examples and Comp. Examples | Major axis diameter (μm) | Minor axis diameter (μm) | Aspect ratio (—) | Geometrical standard deviation (δg) (—) | BET specific surface area (m²/g) | Al content (wt %) |
|---|---|---|---|---|---|---|
| Example | | | | | | |
| 17 | 0.16 | 0.026 | 6.2 | 1.35 | 49.1 | 3.53 |
| 18 | 0.15 | 0.026 | 5.8 | 1.35 | 48.9 | 3.52 |
| 19 | 0.18 | 0.027 | 6.7 | 1.36 | 51.1 | 3.56 |
| 20 | 0.18 | 0.027 | 6.7 | 1.35 | 50.0 | 2.01 |
| 21 | 0.15 | 0.026 | 5.8 | 1.36 | 46.9 | 3.53 |
| 22 | 0.16 | 0.026 | 6.2 | 1.36 | 47.8 | 4.89 |
| Comp. Example | | | | | | |
| 1 | 0.14 | 0.025 | 5.6 | 1.36 | 52.0 | — |
| 2 | 0.23 | 0.030 | 7.7 | 1.37 | 38.5 | — |
| 3 | 0.26 | 0.034 | 7.6 | 1.38 | 33.6 | 0.005 |
| 4 | 0.17 | 0.032 | 5.3 | 1.37 | 38.0 | 73.92 |
| 5 | #0.21 | 0.021 | 10.0 | 1.33 | — | — |
| 6 | ##0.25 | 0.023 | 10.9 | 1.32 | — | — |
| 7 | 0.17 | 0.12 | 1.4 | 1.56 | 13.8 | — |
| 8 | 0.34 | 0.28 | 1.2 | 1.78 | 6.7 | — |

(Note)
: Spindle α-FeOOH particles
: Acicular α-FeOOH particles

Properties of coated acicular or spindle $\alpha$-$Fe_2O_3$ particles

| | Other coating elements | | Filtration productivity | | Removal of solvent |
|---|---|---|---|---|---|
| | Kind | Al content (wt %) | Resistance of filtration (αV) (m/kg) | Filtration time (min) | Amount of remaining C (wt %) |
| Example | | | | | |
| 17 | Zr | 4.58 | 3.21 × 10¹¹ | 2.6 | 0.410 |
| 18 | Zr | 4.88 | 3.30 × 10¹¹ | 2.2 | 0.393 |
| 19 | Sn | 8.52 | 4.56 × 10¹¹ | 2.8 | 0.266 |
| 20 | Sb | 7.66 | 3.68 × 10¹¹ | 2.1 | 0.403 |
| 21 | Si | 2.96 | 8.91 × 10¹¹ | 6.1 | 0.400 |
| | Zr | 1.89 | | | |
| 22 | P | 0.99 | 9.00 × 10¹¹ | 7.2 | 0.430 |
| | Zn | 1.00 | | | |
| Comp. Example | | | | | |
| 1 | — | — | 4.74 × 10¹³ | 42.0 | 0.503 |
| 2 | — | — | 5.32 × 10¹³ | 59.5 | 0.515 |
| 3 | — | — | 1.74 × 10¹³ | 25.0 | 0.500 |
| 4 | — | — | 9.32 × 10¹² | 20.0 | 0.321 |
| 5 | — | — | — | — | 0.705 |
| 6 | — | — | — | — | 0.811 |
| 7 | — | — | — | — | 0.465 |
| 8 | — | — | — | — | 0.423 |

TABLE 5

Properties of non-magnetic undercoating layer

| Examples and Comparative Examples | Non-magnetic particles | Gloss (45°) (%) | Surface roughness of coating film (Ra) (nm) | Young's modulus (relative value) of coating film (—) | Thickness of coating film (μm) |
|---|---|---|---|---|---|
| Example | Example | | | | |
| 23 | 1 | 182 | 11.2 | 121 | 3.8 |
| 24 | 2 | 179 | 12.0 | 132 | 3.7 |
| 25 | 3 | 179 | 11.8 | 128 | 3.8 |
| 26 | 4 | 168 | 14.2 | 136 | 3.6 |
| 27 | 5 | 167 | 14.0 | 136 | 3.7 |
| 28 | 6 | 161 | 14.8 | 143 | 3.9 |
| 29 | 7 | 163 | 14.6 | 146 | 4.0 |
| 30 | 8 | 185 | 11.2 | 125 | 3.9 |

TABLE 5-continued

Properties of non-magnetic undercoating layer

| Examples and Comparative Examples | Non-magnetic particles | Gloss (45°) (%) | Surface roughness of coating film (Ra) (nm) | Young's modulus (relative value) of coating film (−) | Thickness of coating film (μm) |
|---|---|---|---|---|---|
| 31 | 9 | 187 | 11.0 | 126 | 3.9 |
| 32 | 10 | 176 | 11.8 | 119 | 4.1 |
| 33 | 11 | 165 | 13.2 | 123 | 4.2 |
| 34 | 12 | 185 | 11.4 | 119 | 3.6 |
| 35 | 13 | 183 | 11.4 | 118 | 3.6 |
| 36 | 14 | 182 | 11.6 | 123 | 3.8 |
| 37 | 15 | 183 | 11.4 | 123 | 3.8 |
| 38 | 16 | 179 | 12.2 | 120 | 3.7 |

TABLE 6

Properties of non-magnetic undercoating layer

| Examples and Comparative Examples | Non-magnetic particles | Gloss (45°) (%) | Surface roughness of coating film (Ra) (nm) | Young's modulus (relative value) of coating film (−) | Thickness of coating film (μm) |
|---|---|---|---|---|---|
| Example | Example | | | | |
| 39 | 17 | 176 | 12.6 | 125 | 3.8 |
| 40 | 18 | 188 | 11.8 | 121 | 3.8 |
| 41 | 19 | 180 | 11.6 | 124 | 3.8 |
| 42 | 20 | 176 | 12.0 | 129 | 3.7 |
| 43 | 21 | 193 | 10.8 | 135 | 3.9 |
| 44 | 22 | 183 | 11.8 | 118 | 3.8 |
| Comp. Example | Comp. Example | | | | |
| 9 | 1 | 155 | 21.6 | 88 | 3.9 |
| 10 | 2 | 158 | 17.6 | 89 | 4.1 |
| 11 | 3 | 158 | 17.6 | 95 | 3.6 |
| 12 | 4 | 136 | 18.8 | 96 | 4.0 |
| 13 | 5 | 102 | 31.6 | 93 | 4.4 |
| 14 | 6 | 121 | 28.8 | 101 | 4.6 |
| 15 | 7 | 91 | 41.6 | 60 | 3.8 |
| 16 | 8 | 72 | 84.8 | 30 | 3.6 |

TABLE 7

Properties of magnetic tape

| Reference Example | Undercoating layer used | Magnetic particles used | | Coercive force Hc (Oe) | Squareness (−) |
|---|---|---|---|---|---|
| Example | Example | | | | |
| 45 | 23 | Co-coated Fe$_3$O$_4$ particles | | 889 | 0.89 |
| 46 | 30 | Major axis diameter: | 0.20 μm | 893 | 0.88 |
| 47 | 43 | Minor axis diameter: | 0.029 μm | 896 | 0.90 |
| Comp. Example | Comp. Example | Hc: | 850 Oe | | |
| | | δs: | 81.3 emu/g | | |
| 17 | 9 | Co content: | 4.52 wt % | 877 | 0.85 |
| 18 | 14 | Fe$^{2+}$ content: | 16.5 wt % | 869 | 0.83 |
| Example | Example | | | | |
| 48 | 23 | Magnetic metal particles | | 1628 | 0.88 |
| 49 | 30 | Major axis diameter: | 0.13 μm | 1611 | 0.88 |
| 50 | 43 | Minor axis diameter: | 0.017 μm | 1652 | 0.89 |
| Comp. Example | Comp. Example | Hc: | 1560 Oe | | |
| | | δs: | 128.9 emu/g | | |
| 19 | 9 | BET specific | 52.9 m$^2$/g | 1590 | 0.86 |
| 20 | 14 | surface area: | | 1569 | 0.85 |
| | | Co content: | 5.9 wt % | | |
| | | Al content: | 1.1 wt % | | |
| | | B content: | 1.0 wt % | | |

Properties of magnetic tape

| | Gloss of magnetic coating film (45°) (%) | Surface roughness of magnetic coating film (Ra) (nm) | Young's modulus (relative value) of magnetic tape (−) | Thickness of magnetic coating film (μm) | Linear absorption |
|---|---|---|---|---|---|
| Example | | | | | |
| 45 | 178 | 6.0 | 133 | 1.2 | 1.21 |

TABLE 7-continued

| | | | | | |
|---|---|---|---|---|---|
| 46 | 175 | 6.8 | 136 | 1.4 | 1.20 |
| 47 | 181 | 5.6 | 136 | 1.2 | 1.22 |
| Comp. Example | | | | | |
| 17 | 142 | 11.2 | 108 | 1.4 | 1.08 |
| 18 | 125 | 13.6 | 115 | 1.4 | 1.15 |
| Example | | | | | |
| 48 | 235 | 5.6 | 128 | 1.4 | 1.31 |
| 49 | 232 | 5.6 | 126 | 1.4 | 1.28 |
| 50 | 238 | 5.2 | 132 | 1.4 | 1.29 |
| Comp. Example | | | | | |
| 19 | 172 | 18.8 | 93 | 1.2 | 1.15 |
| 20 | 150 | 31.6 | 108 | 1.2 | 1.13 |

TABLE 8

Production of acicular or spindle $\alpha$-$Fe_2O_3$ particles

| | Acicular or spindle $\alpha$-FeOOH | | | | Dehydration | | Annealing | |
|---|---|---|---|---|---|---|---|---|
| Samples Production | Major axis diameter (μm) | Minor axis diameter (μm) | Aspect ratio (—) | BET specific surface area (m²/g) | Temperature (°C.) | Time (min) | Temperature (°C.) | Time (min) |
| 1 | 0.21 | 0.021 | 10.0 | 110.0 | 470 | 60 | 650 | 120 |
| 2 | 0.25 | 0.023 | 10.9 | 75.3 | 470 | 60 | 650 | 120 |
| 3 | 0.21 | 0.021 | 10.0 | 110.0 | 470 | 60 | 650 | 120 |
| 4 | 0.21 | 0.021 | 10.0 | 110.0 | 470 | 60 | 650 | 120 |
| 5 | 0.21 | 0.021 | 10.0 | 110.0 | 470 | 60 | 650 | 120 |
| 6 | 0.21 | 0.021 | 10.0 | 110.0 | 470 | 60 | 650 | 120 |
| 7 | 0.21 | 0.021 | 10.0 | 110.0 | 470 | 60 | 650 | 120 |
| 8 | 0.21 | 0.021 | 10.0 | 110.0 | 470 | 60 | 650 | 120 |
| 9 | 0.25 | 0.023 | 10.9 | 75.3 | 470 | 60 | 650 | 120 |
| 10 | 0.25 | 0.023 | 10.9 | 75.3 | 470 | 60 | 650 | 120 |
| 11 | 0.30 | 0.026 | 11.5 | 46.2 | 470 | 60 | 650 | 120 |
| 12 | 0.30 | 0.026 | 11.5 | 46.2 | 470 | 60 | 650 | 120 |

TABLE 9

Production of acicular or spindle $\alpha$-$Fe_2O_3$ particles

| | Acicular or spindle $\alpha$-FeOOH | | | | Dehydration | | Annealing | |
|---|---|---|---|---|---|---|---|---|
| Samples Production | Major axis diameter (μm) | Minor axis diameter (μm) | Aspect ratio (—) | BET specific surface area (m²/g) | Temperature (°C.) | Time (min) | Temperature (°C.) | Time (min) |
| 13 | 0.21 | 0.021 | 10.0 | 110.0 | 470 | 60 | 650 | 120 |
| 14 | 0.25 | 0.023 | 10.9 | 75.3 | 470 | 60 | 650 | 120 |
| 15 | 0.30 | 0.026 | 11.5 | 46.2 | 470 | 60 | 650 | 120 |
| 16 | 0.21 | 0.021 | 10.0 | 110.0 | 470 | 60 | 650 | 120 |
| 17 | 0.21 | 0.021 | 10.0 | 110.0 | — | — | — | — |
| 18 | 0.25 | 0.023 | 10.9 | 75.3 | — | — | — | — |
| 19 | *0.17 | 0.12 | 1.4 | 13.8 | — | — | — | — |
| 20 | *0.34 | 0.28 | 1.2 | 6.7 | — | — | — | — |

(Note) *: $\alpha$-$Fe_2O_3$ particles obtained by heat-treating magnetite particles were used

TABLE 10

Production of acicular or spindle α-Fe₂O₃ particles coated with Al compound, etc

| Examples and Comparative Examples | Particles to be coated | Coating Al compound | | | Other coating compounds | | | |
|---|---|---|---|---|---|---|---|---|
| | | Kind | Al content (wt %) | pH of suspension (—) | Kind | Element added | Amount of element added (wt %) | pH of suspension (—) |
| Example | Sample | | | | | | | |
| 51 | 7 | NaAlO₂ | 0.50 | 7.0 | — | — | — | — |
| 52 | 8 | Al₂(SO₄)₃ | 1.00 | 7.0 | No. 3 water glass | Si | 2.0 | 6.0 |
| 53 | 9 | Al₂(SO₄)₃ | 2.00 | 8.0 | — | — | — | — |
| 54 | 10 | Al₂(SO₄)₃ | 3.00 | 7.0 | Zirconium sulfate | Zr | 1.0 | 7.0 |
| 55 | 11 | AlCl₃ | 5.00 | 6.0 | — | — | — | — |
| 56 | 12 | Al₂(SO₄)₃ | 10.00 | 7.0 | Zinc sulfate | Zn | 2.0 | 6.0 |
| Comp. Example 21 | 15 | Al₂(SO₄)₃ | 0.005 | 7.0 | — | — | — | — |
| Comp. Example 22 | 16 | NaAlO₂ | 80.00 | 7.0 | — | — | — | — |

TABLE 11

Production of acicular or spindle α-Fe₂O₃ particles coated with coupling agent

| Examples and Comparative Examples | Particles to be coated | Kind of coupling agent | Amount (wt %) | *Process |
|---|---|---|---|---|
| Example | Sample | | | |
| 57 | 1 | γ-aminopropyltri-methoxysilane (A-1100: trade name, produced by Nippon Unicar Co., Ltd.) | 1.0 | A |
| 58 | 2 | Vinyltriethoxysilane (A-151: trade name, produced by Nippon Unicar Co., Ltd.) | 2.0 | B |
| 59 | 3 | Isopropyltri (N-amino ethylaminoethyl) titanate (KR-44: trade name, produced by Ajinomoto Co., Ltd.) | 0.5 | C |
| 60 | 4 | Acetoalkoxyaluminum diisopropylate (AL-M: trade name, produced by Ajinomoto Co., Ltd.) | 2.0 | A |
| 61 | 5 | γ-aminopropyltri-methoxysilane (A-1100: trade name, produced by Nippon Unicar Co., Ltd.) | 5.0 | A |
| 62 | 6 | γ-glycidoxypropyltri-methoxysilane (A-187: trade name, produced by Nippon Unicar Co., Ltd.) | 0.1 | A |
| | Example | | | |
| 63 | 51 | γ-aminopropyltri-methoxysilane (A-1100: trade name, produced by Nippon Unicar Co., Ltd.) | 2.0 | B |
| 64 | 52 | γ-glycidoxypropyltri-methoxysilane (A-187: trade name, produced by Nippon Unicar Co., Ltd.) | 3.0 | A |
| 65 | 53 | γ-aminopropyltri-methoxysilane (A-1100: trade name, produced by Nippon Unicar Co., Ltd.) | 2.0 | A |
| 66 | 54 | γ-aminopropyltri-methoxysilane (A-1100: trade name, produced by Nippon Unicar Co., Ltd.) | 3.0 | B |
| 67 | 55 | Isopropyltri(N-amino-ethylaminoethyl)-titanate (KR-44: trade name, produced by Ajinomoto Co., Ltd.) | 5.0 | A |
| 68 | 56 | Isopropyltri(N-amino-ethylaminoethyl)-titanate (KR-44: trade name, produced by Ajinomoto Co., Ltd.) | 2.0 | A |

(Note) *:
Process A: Dry process
Process B: Wet process using organic solvent as liquid dispersion medium
Process C: Wet process using water as liquid dispersion medium

TABLE 12

Properties of coated acicular or spindle α-Fe$_2$O$_3$ particles

| Examples and Comp. Examples | Major axis diameter (μm) | Minor axis diameter (μm) | Aspect ratio (–) | Geometrical standard deviation (δg) (–) | BET specific surface area (m$^2$/g) | Al content (wt %) | Other coating elements Element | Other coating elements Content (wt %) | Amount of coupling agent (C content) (wt %) |
|---|---|---|---|---|---|---|---|---|---|
| Example | | | | | | | | | |
| 57 | 0.15 | 0.026 | 5.8 | 1.35 | 48.6 | — | — | — | 0.48 |
| 58 | 0.21 | 0.031 | 6.8 | 1.38 | 36.6 | — | — | — | 1.01 |
| 59 | 0.16 | 0.026 | 6.2 | 1.35 | 50.0 | — | — | — | 0.21 |
| 60 | 0.15 | 0.026 | 5.8 | 1.36 | 47.5 | — | — | — | 1.35 |
| 61 | 0.15 | 0.025 | 6.0 | 1.35 | 45.2 | — | — | — | 2.44 |
| 62 | 0.16 | 0.026 | 6.2 | 1.36 | 51.0 | — | — | — | 0.046 |
| 63 | 0.15 | 0.026 | 5.8 | 1.36 | 49.1 | 0.50 | — | — | 0.98 |
| 64 | 0.15 | 0.025 | 6.0 | 1.34 | 48.5 | 1.00 | Si | 1.98 | 1.37 |
| 65 | 0.21 | 0.030 | 7.0 | 1.39 | 37.4 | 1.96 | — | — | 0.97 |
| 66 | 0.21 | 0.030 | 7.0 | 1.38 | 35.8 | 2.98 | Zr | 1.00 | 1.46 |
| 67 | 0.25 | 0.033 | 7.6 | 1.39 | 28.6 | 4.89 | — | — | 2.16 |
| 68 | 0.25 | 0.034 | 7.4 | 1.38 | 29.2 | 9.93 | Zn | 1.95 | 0.86 |

TABLE 13

Properties of coated acicular of spindle α-Fe$_2$O$_3$ particles

| Examples and Comp. Examples | Sample or particles to be coated | Major axis diameter (μm) | Minor axis diameter (μm) | Aspect ratio (–) | Geometrical standard deviation (δg) (–) | BET specific surface area (m$^2$/g) | Al content (wt %) | Other coating elements Element | Other coating elements Content (wt %) | Amount of coupling agent (C content) (wt %) |
|---|---|---|---|---|---|---|---|---|---|---|
| Comp. Example | Sample | | | | | | | | | |
| 23 | 13 | 0.14 | 0.025 | 5.6 | 1.36 | 52.0 | — | — | — | — |
| 24 | 14 | 0.23 | 0.030 | 7.7 | 1.37 | 38.5 | — | — | — | — |
| 25 | 17 | #0.21 | 0.021 | 10.0 | 1.33 | — | — | — | — | — |
| 26 | 18 | ##0.25 | 0.023 | 10.9 | 1.32 | — | — | — | — | — |
| 27 | 19 | 0.17 | 0.12 | 1.4 | 1.56 | 13.8 | — | — | — | — |
| 28 | 20 | 0.34 | 0.28 | 1.2 | 1.78 | 6.7 | — | — | — | — |

(Note)
: Spindle α-FeOOH particles
: Acicular α-FeOOH particles

TABLE 14

Properties of non-magnetic undercoat layer

| Examples and Comparative Examples | Non-magnetic particles | Gloss (45°) (%) | Surface roughness of coating film (Ra) (nm) | Young's modulus (relative value) of coating film (–) | Thickness of coating film (μm) |
|---|---|---|---|---|---|
| Example | Example | | | | |
| 69 | 57 | 168 | 14.4 | 138 | 4.0 |
| 70 | 58 | 164 | 13.6 | 143 | 3.8 |
| 71 | 59 | 160 | 14.8 | 132 | 4.1 |
| 72 | 60 | 168 | 14.2 | 140 | 3.7 |
| 73 | 61 | 171 | 12.8 | 142 | 3.6 |
| 74 | 62 | 162 | 15.2 | 116 | 3.5 |
| 75 | 63 | 179 | 12.0 | 156 | 4.0 |
| 76 | 64 | 189 | 10.2 | 156 | 3.8 |
| 77 | 65 | 180 | 11.6 | 146 | 3.5 |
| 78 | 66 | 193 | 9.8 | 161 | 3.6 |
| 79 | 67 | 172 | 12.2 | 145 | 3.9 |
| 80 | 68 | 183 | 10.8 | 149 | 4.0 |

TABLE 15

| Examples and Comparative Examples | Properties of non-magnetic undercoat layer ||||| 
| | Non-magnetic particles | Gloss (45°) (%) | Surface roughness of coating film (Ra) (nm) | Young's modulus (relative value) of coating film (-) | Thickness of coating film (μm) |
| --- | --- | --- | --- | --- | --- |
| Comp. Example 29 | Comp. Example 23 | 155 | 21.6 | 88 | 3.9 |
| Comp. Example 30 | Comp. Example 24 | 158 | 17.6 | 89 | 4.1 |
| Comp. Example 31 | Comp. Example 25 | 102 | 31.6 | 93 | 4.4 |
| 32 | 26 | 121 | 28.8 | 101 | 4.6 |
| 33 | 27 | 91 | 41.6 | 60 | 3.8 |
| 34 | 28 | 72 | 84.8 | 30 | 3.6 |

TABLE 16

| Reference Example | Undercoating layer used | Magnetic particles used | | Coercive force Hc (Oe) | Squareness (-) |
| --- | --- | --- | --- | --- | --- |
| Example 81 | Example 69 | Co-coated $Fe_3O_4$ particles | | 882 | 0.88 |
| 82 | 75 | Major axial diameter: | 0.20 μm | 889 | 0.88 |
| 83 | 76 | Minor axial diameter: | 0.029 μm | 892 | 0.89 |
| Comp. Example | Comp. Example | Hc: | 850 Oe | | |
| | | δs: | 81.3 emu/g | | |
| 35 | 29 | Co content: | 4.52 wt % | 877 | 0.85 |
| 36 | 32 | $Fe^{2+}$ content: | 16.5 wt % | 869 | 0.83 |
| Example 84 | Example 69 | Magnetic metal particles | | 1620 | 0.88 |
| 85 | 75 | Major axial diameter: | 0.13 μm | 1636 | 0.89 |
| 86 | 76 | Minor axial diameter: | 0.017 μm | 1662 | 0.90 |
| Comp. Example | Comp. Example | Hc: | 1560 Oe | | |
| | | δs: | 128.9 emu/g | | |
| 37 | 29 | BET specific surface area: | 52.9 m²/g | 1590 | 0.86 |
| 38 | 32 | | | 1569 | 0.85 |
| | | Co content: | 5.9 wt % | | |
| | | Al content: | 1.1 wt % | | |
| | | B content: | 1.0 wt % | | |

| | Properties of magnetic tape |||||
| | Gloss of magnetic coating film (45°) (%) | Surface roughness of magnetic coating film (Ra) (nm) | Young's modulus (relative value) of magnetic tape (-) | Thickness of magnetic coating film (μm) | Linear absorption |
| --- | --- | --- | --- | --- | --- |
| Example 81 | 172 | 7.2 | 147 | 1.2 | 1.21 |
| 82 | 176 | 6.6 | 160 | 1.2 | 1.20 |
| 83 | 180 | 6.0 | 163 | 1.4 | 1.22 |
| Comp. Example 35 | 142 | 11.2 | 108 | 1.4 | 1.08 |
| 36 | 125 | 13.6 | 115 | 1.4 | 1.15 |
| Example 84 | 230 | 5.6 | 142 | 1.2 | 1.29 |
| 85 | 235 | 5.2 | 158 | 1.2 | 1.35 |
| 86 | 236 | 5.0 | 162 | 1.2 | 1.34 |

TABLE 16-continued

| Comp. Example | | | | | |
|---|---|---|---|---|---|
| 37 | 172 | 18.8 | 93 | 1.2 | 1.15 |
| 38 | 150 | 31.6 | 108 | 1.2 | 1.13 |

What is claimed is:

1. A non-magnetic undercoating layer for a magnetic recording medium formed on a non-magnetic substrate, comprising non-magnetic particles composed of acicular or spindle-shaped $\alpha$-$Fe_2O_3$ particles coated with at least one member selected from the group consisting of an Al compound, a silane coupling agent, a titanate coupling agent, an aluminate coupling agent and a zirconate coupling agent, the amount of said at least one member selected from the group consisting of an Al compound, calculated as Al, a silane coupling agent, a titanate coupling agent, an aluminate coupling agent and a zirconate coupling agent being 0.01 to 50 parts by weight based on 100 parts by weight of said $\alpha$-$Fe_2O_3$ particles; wherein said particles have an average major axis diameter of 0.05 to 0.25 μm, an average minor axis diameter of 0.010 to 0.035 μm, an aspect ratio of 2 to 20, and a particle size distribution in geometrical standard deviation of not more than 1.40, and the thickness of the non-magnetic undercoating layer is 1 to 10 μm.

2. A non-magnetic undercoating layer according to claim 1, wherein said $\alpha$-$Fe_2O_3$ particles are particles coated with an Al compound.

3. A non-magnetic undercoating layer according to claim 1, wherein said $\alpha$-$Fe_2O_3$ particles are particles coated with an Al compound and one selected from the group consisting of a silane coupling agent, a titanate coupling agent, an aluminate coupling agent and a zirconate coupling agent.

4. A non-magnetic undercoating layer according to claim 1, wherein the content of non-magnetic particles in the non-magnetic undercoating layer is 65 to 95 wt %.

5. A non-magnetic undercoating layer according to claim 1, wherein said acicular or spindle-shaped $\alpha$-$Fe_2O_3$ particles coated with Al compound are further coated with at least one selected from the group consisting of a Si compound, a P compound, a Ti compound, a Mn compound, a Ni compound, a Zn compound, a Zr compound, a Sn compound and a Sb compound.

6. A non-magnetic undercoating layer according to claim 1, wherein said acicular or spindle-shaped $\alpha$-$Fe_2O_3$ particles are coated with Al compound and with at least one selected from the group consisting of a Si compound, a P compound, a Ti compound, a Mn compound, a Ni compound, a Zn compound, a Zr compound, a Sn compound and a Sb compound.

7. A non-magnetic undercoating layer according to claim 1, wherein said non-magnetic undercoating layer has a gloss (45°) of not less than 160%, a surface roughness (Ra) of not more than 17 nm.

8. A magnetic recording medium comprising:

a non-magnetic substrate;

an undercoating layer 1 to 10 μm thick formed on said non-magnetic substrate comprising non-magnetic particles composed of acicular or spindle-shaped $\alpha$-$Fe_2O_3$ particles coated with at least one member selected from the group consisting of an Al compound, a silane coupling agent, a titanate coupling agent, an aluminate coupling agent and a zirconate coupling agent, the amount of at least one member selected from the group consisting of an Al compound, calculated as Al, a silane coupling agent, a titanate coupling agent, an aluminate coupling agent and a zirconate coupling agent being 0.01 to 50 parts by weight based on 100 parts by weight of said $\alpha$-$Fe_2O_3$ particles, wherein said particles have an average major axis diameter of 0.05 to 0.25 μm, an average minor axis diameter of 0.010 to 0.035 μm, an aspect ratio of 2.20, and a particle size distribution in geometrical standard deviation of not more than 1.40;

a binder resin; and a magnetic coating layer containing magnetic particles and a binder resin.

9. A magnetic recording medium according to claim 8, wherein the content of non-magnetic particles in the non-magnetic undercoating layer is 65 to 95 wt %.

10. A magnetic recording medium according to claim 8, wherein said $\alpha$-$Fe_2O_3$ particles are coated with an Al compound, the amount of the Al compound being 0.01 to 50 parts by weight, calculated as Al, based on 100 parts by weight of said $\alpha$-$Fe_2O_3$ particles.

11. A magnetic recording medium according to claim 8, wherein said $\alpha$-$Fe_2O_3$ particles are coated with an Al compound and at least one coupling agent selected from the group consisting of a silane coupling agent, a titanate coupling agent, an aluminate coupling agent and a zirconate coupling agent, the amount of the Al compound being 0.01 to 50 parts by weight, calculated as Al, based on 100 parts by weight of said $\alpha$-$Fe_2O_3$ particles, and the amount of the coupling agent being 0.01 to 20 parts by weight based on 100 parts by weight of said $\alpha$-$Fe_2O_3$ particles.

12. A magnetic recording medium according to claim 8, wherein the content of non-magnetic particles in the non-magnetic undercoating layer is 65 to 95 wt %.

13. A magnetic recording medium according to claim 8, wherein said magnetic recording medium has a coercive force of not less than 500 Oe, a squareness of not less than 0.85, a gloss (45°) of not less than 170%, surface roughness (Ra) of not more than 10 nm, and a linear absorption coefficient of not less than 1.15 μm$^{-1}$.

14. A magnetic recording medium according to claim 9, wherein the amount of said compound is 0.01 to 50 parts by weight based on 100 parts by weight of said $\alpha$-$Fe_2O_3$ particles.

* * * * *